US011144709B2

(12) United States Patent
Dale et al.

(10) Patent No.: US 11,144,709 B2
(45) Date of Patent: Oct. 12, 2021

(54) METHOD AND APPARATUS FOR INTERACTIVE REPORTS

(71) Applicant: ARRIA DATA2TEXT LIMITED, Aberdeen (GB)

(72) Inventors: Robert Dale, Sydney (AU); Mario Feegrade, Aberdeen (GB); Neil Burnett, Inverurie (GB); William Anthony Bradshaw, Aberdeen (GB)

(73) Assignee: ARRIA DATA2TEXT LIMITED, Aberdeen (GB)

( * ) Notice: Subject to any disclaimer, the term of this patent is extended or adjusted under 35 U.S.C. 154(b) by 300 days.

(21) Appl. No.: 16/277,583

(22) Filed: Feb. 15, 2019

(65) Prior Publication Data
US 2020/0019592 A1    Jan. 16, 2020

Related U.S. Application Data

(63) Continuation of application No. 14/961,222, filed on Dec. 7, 2015, now Pat. No. 10,255,252, which is a
(Continued)

(51) Int. Cl.
 *G06F 40/137*    (2020.01)
 *G06F 40/134*    (2020.01)
(Continued)

(52) U.S. Cl.
 CPC ........ *G06F 40/134* (2020.01); *G06F 3/04842* (2013.01); *G06F 40/169* (2020.01);
(Continued)

(58) Field of Classification Search
 CPC .................................................. G06F 40/137
(Continued)

(56) References Cited

U.S. PATENT DOCUMENTS 5,181,250 A * 1/1993 Morgan ............. G01C 21/3629
340/988
5,237,502 A * 8/1993 White ..................... G06F 40/56
704/1
(Continued)

FOREIGN PATENT DOCUMENTS

AU    2011247830 B2    12/2011
AU    2011253627 B2    12/2011
(Continued)

OTHER PUBLICATIONS

Alawneh et al., "Pattern Recognition Techniques Applied to the Abstraction of Traces of Inter-Process Communication," Software Maintenance and Reengineering (CSMR), 2011 15th European Conference on Year: 2011, IEEE Conference Publications, pp. 211-220, (2.
(Continued)

*Primary Examiner* — Reza Nabi
(74) *Attorney, Agent, or Firm* — Alston & Bird LLP

(57) ABSTRACT

Methods, apparatus and computer program products for interactive reports are disclosed herein. In some examples, a method for generating an output report that is an interactive report may include identifying one or more messages to be hyperlinked in an output report, wherein the one or more messages are data structures that are configured to linguistically describe at least a portion of raw input data; determining one or more interactive responses based on the one or more messages to be hyperlinked; determining one or more words in a phrase specification that are related to the one or more messages to be hyperlinked; and generating the output report, wherein the one or more words are hyperlinked in the output report such that when selected at least one of the one or more interactive responses is performed.

19 Claims, 7 Drawing Sheets

Related U.S. Application Data continuation of application No. 14/027,775, filed on Sep. 16, 2013, now Pat. No. 9,244,894.

(51) Int. Cl.
| | |
|---|---|
| *G06F 40/169* | (2020.01) |
| *G06F 40/253* | (2020.01) |
| *G06F 40/279* | (2020.01) |
| *G06F 40/284* | (2020.01) |
| *G06F 40/289* | (2020.01) |
| *G06F 3/0484* | (2013.01) |
| *G06T 11/20* | (2006.01) |
| *G06T 11/60* | (2006.01) |

(52) U.S. Cl.
CPC .......... *G06F 40/253* (2020.01); *G06F 40/279* (2020.01); *G06F 40/284* (2020.01); *G06F 40/289* (2020.01); *G06T 11/206* (2013.01); *G06T 11/60* (2013.01)

(58) Field of Classification Search
USPC .......................................................... 706/47
See application file for complete search history.

(56) References Cited

U.S. PATENT DOCUMENTS

| | | | | |
|---|---|---|---|---|
| 5,311,429 | A * | 5/1994 | Tominaga | G06F 40/253 704/10 |
| 5,321,608 | A * | 6/1994 | Namba | G06F 40/253 704/9 |
| 5,629,687 | A * | 5/1997 | Sutton | G08B 25/08 340/541 |
| 5,794,177 | A * | 8/1998 | Carus | G06F 40/268 704/9 |
| 5,802,488 | A * | 9/1998 | Edatsune | G10L 15/26 704/231 |
| 6,023,669 | A * | 2/2000 | Suda | G06F 40/35 704/2 |
| 6,078,914 | A * | 6/2000 | Redfern | G06F 16/951 |
| 6,138,087 | A * | 10/2000 | Budzinski | G06F 16/36 704/9 |
| 6,157,905 | A * | 12/2000 | Powell | G06F 40/126 704/2 |
| 6,266,617 | B1 * | 7/2001 | Evans | G08G 1/205 340/436 |
| 6,370,497 | B1 * | 4/2002 | Knowles | G06F 40/137 704/1 |
| 6,442,485 | B2 | 8/2002 | Evans | |
| 6,466,899 | B1 * | 10/2002 | Yano | G06F 40/56 704/1 |
| 6,629,340 | B1 * | 10/2003 | Dale | D04H 3/11 28/104 |
| 6,665,640 | B1 * | 12/2003 | Bennett | G09B 5/04 704/257 |
| 6,717,513 | B1 * | 4/2004 | Sandelman | G06F 11/0784 340/506 |
| 6,947,885 | B2 | 9/2005 | Bangalore et al. | |
| 7,043,420 | B2 * | 5/2006 | Ratnaparkhi | G06F 40/56 704/9 |
| 7,167,824 | B2 | 1/2007 | Kallulli | |
| 7,231,341 | B2 | 6/2007 | Bangalore et al. | |
| 7,238,313 | B2 * | 7/2007 | Ferencz | D04H 1/43835 264/211 |
| 7,305,336 | B2 * | 12/2007 | Polanyi | G06F 16/345 704/9 |
| 7,310,969 | B2 * | 12/2007 | Dale | B65D 88/121 454/118 |
| 7,346,493 | B2 * | 3/2008 | Ringger | G10L 15/26 704/9 |
| 7,418,447 | B2 * | 8/2008 | Caldwell | G06Q 30/02 705/26.1 |
| 7,424,363 | B2 * | 9/2008 | Cheng | G01C 21/3641 340/995.23 |
| 7,444,287 | B2 * | 10/2008 | Claudatos | G08B 13/1672 348/143 |
| 7,496,621 | B2 * | 2/2009 | Pan | G06F 40/30 708/800 |
| 7,526,424 | B2 | 4/2009 | Corston-Oliver et al. | |
| 7,533,089 | B2 * | 5/2009 | Pan | G06F 40/56 |
| 7,562,005 | B1 | 7/2009 | Bangalore et al. | |
| 7,653,545 | B1 * | 1/2010 | Starkie | H04M 3/493 704/275 |
| 7,657,424 | B2 * | 2/2010 | Bennett | G06F 40/30 704/9 |
| 7,684,991 | B2 * | 3/2010 | Stohr | G06F 16/68 704/270.1 |
| 7,711,581 | B2 * | 5/2010 | Hood | G16H 40/63 705/3 |
| 7,783,486 | B2 * | 8/2010 | Rosser | G10L 15/22 704/270 |
| 7,809,552 | B2 * | 10/2010 | Pan | G06F 40/284 704/9 |
| 7,849,048 | B2 * | 12/2010 | Langseth | G06F 16/254 707/602 |
| 7,849,049 | B2 * | 12/2010 | Langseth | G06F 16/254 707/602 |
| 7,856,390 | B2 * | 12/2010 | Schiller | G06Q 40/06 705/36 R |
| 7,873,509 | B1 | 1/2011 | Budzinski | |
| 7,921,091 | B2 * | 4/2011 | Cox | G06F 16/3344 707/705 |
| 7,930,169 | B2 | 4/2011 | Billerey-Mosier | |
| 7,933,774 | B1 * | 4/2011 | Begeja | G10L 15/063 704/243 |
| 7,966,172 | B2 * | 6/2011 | Ruiz | G06F 40/237 704/9 |
| 7,966,369 | B1 * | 6/2011 | Briere | G06F 16/248 709/204 |
| 7,970,601 | B2 * | 6/2011 | Burmester | G06F 8/10 704/9 |
| 7,979,267 | B2 * | 7/2011 | Ruiz | G06F 16/243 704/9 |
| 8,015,006 | B2 * | 9/2011 | Kennewick | G10L 15/1822 704/236 |
| 8,019,610 | B2 * | 9/2011 | Walker | G10L 13/027 704/275 |
| 8,024,331 | B2 * | 9/2011 | Calistri-Yeh | G06F 16/36 707/728 |
| 8,037,000 | B2 * | 10/2011 | Delmonico | G06N 5/045 706/45 |
| 8,082,144 | B1 * | 12/2011 | Brown | G06Q 20/207 704/9 |
| 8,090,727 | B2 * | 1/2012 | Lachtarnik | G06F 40/237 707/754 |
| 8,117,261 | B2 | 2/2012 | Briere et al. | |
| 8,150,676 | B1 * | 4/2012 | Kaeser | G06F 40/56 704/1 |
| 8,175,873 | B2 * | 5/2012 | Di Fabbrizio | G06F 40/56 704/235 |
| 8,180,647 | B2 | 5/2012 | Walker et al. | |
| 8,180,758 | B1 * | 5/2012 | Cornali | G06F 16/28 707/707 |
| 8,229,937 | B2 * | 7/2012 | Kiefer | G06Q 10/06 707/756 |
| 8,311,863 | B1 * | 11/2012 | Kemp | G06Q 10/0639 705/7.11 |
| 8,355,903 | B1 * | 1/2013 | Birnbaum | G06Q 10/10 704/9 |
| 8,374,848 | B1 * | 2/2013 | Birnbaum | G06F 40/40 704/9 |
| 8,425,325 | B2 | 4/2013 | Hope | |
| 8,473,911 | B1 * | 6/2013 | Baxter | G06F 8/73 717/123 |
| 8,494,944 | B2 | 7/2013 | Schiller | |
| 8,515,733 | B2 * | 8/2013 | Jansen | G06F 40/211 704/9 |
| 8,515,737 | B2 * | 8/2013 | Allen | G06F 40/289 704/9 |

(56) References Cited

U.S. PATENT DOCUMENTS

| | | | |
|---|---|---|---|
| 8,521,512 B2 * | 8/2013 | Gorman | G06F 40/30 704/9 |
| 8,548,814 B2 * | 10/2013 | Manuel-Devadoss | G06F 40/55 704/277 |
| 8,548,915 B2 * | 10/2013 | Antebi | G06N 5/02 705/45 |
| 8,561,014 B2 * | 10/2013 | Mengusoglu | G06F 8/10 717/104 |
| 8,566,090 B2 | 10/2013 | Di Fabbrizio et al. | |
| 8,572,173 B2 | 10/2013 | Briere et al. | |
| 8,589,148 B2 * | 11/2013 | Atallah | G06F 40/211 704/9 |
| 8,589,172 B2 * | 11/2013 | Alonso | G06Q 30/02 704/275 |
| 8,616,896 B2 * | 12/2013 | Lennox | G06F 16/285 434/322 |
| 8,620,669 B2 | 12/2013 | Walker et al. | |
| 8,626,613 B2 * | 1/2014 | Dale | A47F 5/0869 705/28 |
| 8,630,844 B1 * | 1/2014 | Nichols | G06F 40/151 704/9 |
| 8,655,889 B2 * | 2/2014 | Hua | G06F 16/9537 707/748 |
| 8,660,545 B1 * | 2/2014 | Redford | H04N 21/4882 455/418 |
| 8,676,691 B2 | 3/2014 | Schiller | |
| 8,688,434 B1 * | 4/2014 | Birnbaum | G06F 40/56 704/9 |
| 8,689,176 B2 * | 4/2014 | Bagheri | G06F 40/197 717/106 |
| 8,700,396 B1 * | 4/2014 | Mengibar | G10L 13/027 704/235 |
| 8,711,732 B2 * | 4/2014 | Johnson | H04W 4/90 370/259 |
| 8,719,696 B2 * | 5/2014 | Duncan | G06F 40/154 715/236 |
| 8,738,384 B1 * | 5/2014 | Bansal | G10L 15/22 704/275 |
| 8,738,558 B2 | 5/2014 | Antebi et al. | |
| 8,762,134 B2 | 5/2014 | Reiter | |
| 8,762,133 B2 | 6/2014 | Reiter | |
| 8,775,161 B1 * | 7/2014 | Nichols | G06Q 40/04 704/9 |
| 8,825,533 B2 * | 9/2014 | Basson | G06Q 30/0281 705/26.64 |
| 8,843,363 B2 | 9/2014 | Birnbaum et al. | |
| 8,849,670 B2 * | 9/2014 | Di Cristo | G10L 15/1822 704/270.1 |
| 8,886,520 B1 * | 11/2014 | Nichols | G06F 16/345 704/9 |
| 8,892,417 B1 * | 11/2014 | Nichols | G06F 40/56 704/1 |
| 8,892,419 B2 * | 11/2014 | Lundberg | G06F 40/58 704/8 |
| 8,898,063 B1 * | 11/2014 | Sykes | G06Q 40/04 704/270 |
| 8,903,711 B2 | 12/2014 | Lundberg et al. | |
| 8,903,718 B2 * | 12/2014 | Akuwudike | G06F 16/3329 704/10 |
| 8,909,595 B2 * | 12/2014 | Gandy | G06F 40/174 707/603 |
| 8,914,452 B2 | 12/2014 | Boston et al. | |
| 8,924,330 B2 | 12/2014 | Antebi et al. | |
| 8,930,178 B2 * | 1/2015 | Pestian | G16H 50/70 704/9 |
| 8,930,305 B2 * | 1/2015 | Namburu | G06Q 10/06 707/609 |
| 8,935,769 B2 * | 1/2015 | Hessler | H04L 63/08 726/7 |
| 8,977,953 B1 * | 3/2015 | Pierre | G06F 16/38 715/230 |
| 8,984,051 B2 * | 3/2015 | Olsen | H04L 51/28 709/203 |
| 9,002,695 B2 * | 4/2015 | Watanabe | G06F 40/55 704/2 |
| 9,002,869 B2 * | 4/2015 | Riezler | G06F 16/3338 707/760 |
| 9,015,730 B1 | 4/2015 | Allen et al. | |
| 9,028,260 B2 * | 5/2015 | Nanjiani | G09B 7/02 434/323 |
| 9,092,276 B2 | 7/2015 | Allen et al. | |
| 9,104,720 B2 * | 8/2015 | Rakshit | G06F 16/242 |
| 9,110,882 B2 | 8/2015 | Overell et al. | |
| 9,110,977 B1 * | 8/2015 | Pierre | G06F 16/3334 |
| 9,111,534 B1 * | 8/2015 | Sylvester | G06Q 30/0251 |
| 9,135,244 B2 * | 9/2015 | Reiter | G06F 40/253 |
| 9,135,662 B2 * | 9/2015 | Evenhouse | H04L 12/1859 |
| 9,146,904 B2 | 9/2015 | Allen | |
| 9,164,982 B1 * | 10/2015 | Kaeser | G06F 40/40 |
| 9,173,005 B1 | 10/2015 | Redford et al. | |
| 9,190,054 B1 * | 11/2015 | Riley | G10L 15/22 |
| 9,208,147 B1 * | 12/2015 | Nichols | G06F 40/56 |
| 9,229,927 B2 * | 1/2016 | Wolfram | G06F 40/40 |
| 9,240,197 B2 * | 1/2016 | Begeja | G10L 15/1815 |
| 9,244,894 B1 * | 1/2016 | Dale | G06F 40/279 |
| 9,251,134 B2 | 2/2016 | Birnbaum et al. | |
| 9,251,143 B2 | 2/2016 | Bird et al. | |
| 9,263,039 B2 | 2/2016 | Di Cristo et al. | |
| 9,268,770 B1 * | 2/2016 | Kursun | G06F 40/30 |
| 9,323,743 B2 | 4/2016 | Reiter | |
| 9,396,181 B1 * | 7/2016 | Sripada | G06F 16/31 |
| 9,405,448 B2 | 8/2016 | Reiter | |
| 9,600,471 B2 | 3/2017 | Bradshaw et al. | |
| 9,640,045 B2 | 5/2017 | Reiter | |
| 9,904,676 B2 | 2/2018 | Sripada et al. | |
| 9,990,360 B2 | 6/2018 | Sripada | |
| 10,026,274 B2 | 7/2018 | Reiter | |
| 10,115,202 B2 | 10/2018 | Sripada | |
| 10,282,422 B2 | 5/2019 | Sripada et al. | |
| 10,282,878 B2 | 5/2019 | Reiter | |
| 10,565,308 B2 | 2/2020 | Reiter | |
| 10,664,558 B2 | 5/2020 | Mahamood | |
| 10,853,586 B2 * | 12/2020 | Reiter | G06F 40/289 |
| 10,860,812 B2 * | 12/2020 | Sripada | G06F 40/134 |
| 10,963,650 B2 * | 3/2021 | Reiter | G06F 40/157 |
| 2002/0026306 A1 * | 2/2002 | Bangalore | G06F 40/211 704/9 |
| 2002/0143742 A1 * | 10/2002 | Nonomura | G06F 16/83 |
| 2003/0131315 A1 * | 7/2003 | Escher | G06Q 40/06 715/255 |
| 2003/0182102 A1 * | 9/2003 | Corston-Oliver | G06F 40/56 704/9 |
| 2003/0195740 A1 * | 10/2003 | Tokuda | G10L 15/26 704/1 |
| 2003/0212545 A1 * | 11/2003 | Kallulli | G10L 13/02 704/9 |
| 2004/0044515 A1 * | 3/2004 | Metcalf | G06F 40/35 704/1 |
| 2004/0246120 A1 * | 12/2004 | Benner | H04N 1/00244 340/506 |
| 2005/0039107 A1 * | 2/2005 | Hander | G06F 40/56 715/256 |
| 2005/0108001 A1 * | 5/2005 | Aarskog | G06F 40/289 704/10 |
| 2005/0228635 A1 * | 10/2005 | Araki | G06F 40/216 704/1 |
| 2005/0256703 A1 * | 11/2005 | Markel | G06Q 40/04 704/223 |
| 2006/0020886 A1 * | 1/2006 | Agrawal | G06F 40/186 715/256 |
| 2006/0020916 A1 * | 1/2006 | Allison | G06F 40/253 717/114 |
| 2006/0085667 A1 * | 4/2006 | Kubota | G06F 16/345 714/4.1 |
| 2006/0136196 A1 * | 6/2006 | Brun | G06F 40/295 704/8 |
| 2006/0178868 A1 * | 8/2006 | Billerey-Mosier | G06F 40/56 704/9 |

(56) References Cited

U.S. PATENT DOCUMENTS

| | | | | |
|---|---|---|---|---|
| 2006/0224638 A1* | 10/2006 | Wald | G06F 16/2379 | |
| 2006/0242563 A1* | 10/2006 | Liu | G06F 40/154 | 715/234 |
| 2006/0259293 A1* | 11/2006 | Orwant | G06F 40/143 | 704/9 |
| 2007/0038643 A1* | 2/2007 | Epstein | G06F 40/106 | |
| 2007/0078655 A1* | 4/2007 | Semkow | G10L 13/00 | 704/258 |
| 2007/0094060 A1* | 4/2007 | Apps | G06F 16/2465 | 705/7.36 |
| 2007/0106628 A1* | 5/2007 | Adjali | G06N 20/00 | 706/45 |
| 2007/0129942 A1* | 6/2007 | Ban | G06F 40/169 | 704/235 |
| 2007/0143099 A1* | 6/2007 | Balchandran | G10L 15/18 | 704/9 |
| 2007/0150806 A1* | 6/2007 | Hartmann | G06F 40/226 | 715/235 |
| 2007/0156677 A1* | 7/2007 | Szabo | G06F 16/2457 | |
| 2007/0169021 A1* | 7/2007 | Huynh | G16H 15/00 | 717/136 |
| 2007/0219773 A1* | 9/2007 | Roux | G06F 40/237 | 704/1 |
| 2008/0221865 A1* | 9/2008 | Wellmann | G01C 21/3629 | 704/8 |
| 2008/0221870 A1* | 9/2008 | Attardi | G06F 40/151 | 704/9 |
| 2008/0281781 A1* | 11/2008 | Zhao | G06F 16/38 | |
| 2008/0312954 A1* | 12/2008 | Ullrich | G06Q 10/10 | 705/2 |
| 2009/0089100 A1* | 4/2009 | Nenov | G16H 10/60 | 705/3 |
| 2009/0089126 A1* | 4/2009 | Odubiyi | G06Q 10/06 | 705/7.39 |
| 2009/0111486 A1* | 4/2009 | Burstrom | H04M 1/72457 | 455/456.3 |
| 2009/0138258 A1* | 5/2009 | Neale | G06F 40/186 | 704/9 |
| 2009/0156229 A1* | 6/2009 | Hein | G01C 21/20 | 455/456.1 |
| 2009/0177929 A1* | 7/2009 | Sijelmassi | G06F 11/0709 | 714/47.2 |
| 2009/0182549 A1* | 7/2009 | Anisimovich | G06F 40/55 | 704/4 |
| 2009/0198496 A1* | 8/2009 | Denecke | G10L 15/26 | 704/257 |
| 2009/0254572 A1* | 10/2009 | Redlich | G06Q 10/06 | |
| 2009/0259612 A1* | 10/2009 | Hanson | H04L 69/22 | 706/47 |
| 2009/0276383 A1* | 11/2009 | Salahshour | G06F 9/542 | 706/12 |
| 2009/0281839 A1* | 11/2009 | Lynn | G16H 30/40 | 705/3 |
| 2009/0286514 A1* | 11/2009 | Lichorowic | G10L 13/00 | 455/412.2 |
| 2009/0287567 A1* | 11/2009 | Penberthy | G06Q 30/0244 | 705/14.43 |
| 2010/0070448 A1* | 3/2010 | Omoigui | H01L 27/14647 | 706/47 |
| 2010/0082515 A1* | 4/2010 | Relyea | G06N 3/006 | 706/47 |
| 2010/0146491 A1* | 6/2010 | Hirano | G06F 9/454 | 717/137 |
| 2010/0153095 A1* | 6/2010 | Yang | G06F 16/3329 | 704/9 |
| 2010/0174545 A1* | 7/2010 | Otani | G10L 13/00 | 704/260 |
| 2010/0191658 A1* | 7/2010 | Kannan | G06Q 30/02 | 705/304 |
| 2010/0203970 A1* | 8/2010 | Hope | G06F 16/4393 | 463/42 |
| 2010/0210379 A1* | 8/2010 | Shelley | A63B 69/0071 | 473/433 |
| 2010/0306249 A1* | 12/2010 | Hill | G06Q 50/01 | 707/769 |
| 2010/0332235 A1* | 12/2010 | David | G06F 16/3329 | 704/275 |
| 2011/0010164 A1* | 1/2011 | Williams | G10L 15/063 | 704/9 |
| 2011/0035210 A1* | 2/2011 | Rosenfeld | G06F 40/295 | 704/9 |
| 2011/0055687 A1* | 3/2011 | Bhandar | G06F 17/00 | 715/235 |
| 2011/0068929 A1* | 3/2011 | Franz | A61B 5/746 | 340/573.1 |
| 2011/0087486 A1* | 4/2011 | Schiller | G06F 40/166 | 704/9 |
| 2011/0160986 A1* | 6/2011 | Wu | G08G 1/0962 | 701/117 |
| 2011/0179006 A1 | 7/2011 | Cox et al. | | |
| 2011/0184959 A1* | 7/2011 | Maxwell, III | G16H 70/00 | 707/754 |
| 2011/0218822 A1* | 9/2011 | Buisman | G16H 15/00 | 705/3 |
| 2011/0225185 A1* | 9/2011 | Gupta | G06F 16/338 | 707/769 |
| 2011/0257839 A1* | 10/2011 | Mukherjee | B64F 5/60 | 701/33.4 |
| 2011/0307435 A1* | 12/2011 | Overell | G06N 20/00 | 706/46 |
| 2011/0313757 A1* | 12/2011 | Hoover | G06F 40/205 | 704/9 |
| 2011/0314060 A1* | 12/2011 | Sinha | G06F 16/86 | 707/779 |
| 2012/0078888 A1* | 3/2012 | Brown | G06F 16/3329 | 707/723 |
| 2012/0084027 A1* | 4/2012 | Caine | H02S 50/10 | 702/58 |
| 2012/0089549 A1* | 4/2012 | Burckart | G06Q 10/0635 | 706/47 |
| 2012/0136649 A1* | 5/2012 | Freising | G06F 40/30 | 704/9 |
| 2012/0158089 A1* | 6/2012 | Bocek | A61N 1/37 | 607/28 |
| 2012/0173475 A1* | 7/2012 | Ash | G06F 16/254 | 707/600 |
| 2012/0232919 A1* | 9/2012 | Wilson | G06Q 10/10 | 705/2 |
| 2012/0290289 A1* | 11/2012 | Manera | G06F 16/345 | 704/9 |
| 2012/0290310 A1* | 11/2012 | Watson | G16H 50/20 | 705/2 |
| 2012/0310990 A1* | 12/2012 | Viegas | G06F 16/44 | 707/794 |
| 2013/0030810 A1* | 1/2013 | Kopparapu | G10L 15/06 | 704/260 |
| 2013/0066873 A1* | 3/2013 | Salvetti | G06Q 30/0278 | 707/738 |
| 2013/0095864 A1* | 4/2013 | Marovets | H04L 51/08 | 455/466 |
| 2013/0138428 A1* | 5/2013 | Chandramouli | G06F 40/40 | 704/9 |
| 2013/0144606 A1 | 6/2013 | Birnbaum et al. | | |
| 2013/0145242 A1 | 6/2013 | Birnbaum et al. | | |
| 2013/0151238 A1* | 6/2013 | Beaurpere | G06F 40/242 | 704/9 |
| 2013/0174026 A1* | 7/2013 | Locke | G06F 40/166 | 715/254 |
| 2013/0185050 A1* | 7/2013 | Bird | G06F 16/3329 | 704/2 |
| 2013/0185056 A1* | 7/2013 | Ingram | G06F 40/40 | 704/9 |
| 2013/0205195 A1* | 8/2013 | Dekhil | G06Q 10/10 | 715/234 |
| 2013/0211855 A1* | 8/2013 | Eberle | A61N 1/37282 | 705/3 |

(56) References Cited

U.S. PATENT DOCUMENTS

| | | | |
|---|---|---|---|
| 2013/0238329 A1* | 9/2013 | Casella dos Santos | G16H 15/00 704/235 |
| 2013/0238330 A1* | 9/2013 | Casella dos Santos | G10L 15/183 704/235 |
| 2013/0238987 A1* | 9/2013 | Lutwyche | G06F 40/166 715/256 |
| 2013/0251233 A1* | 9/2013 | Yang | G16H 30/20 382/132 |
| 2013/0268263 A1* | 10/2013 | Park | G06F 40/111 704/9 |
| 2013/0293363 A1* | 11/2013 | Plymouth | H04L 63/1425 340/309.16 |
| 2013/0311201 A1* | 11/2013 | Chatfield | G16H 15/00 705/3 |
| 2014/0019531 A1* | 1/2014 | Czajka | G06F 16/285 709/203 |
| 2014/0025371 A1* | 1/2014 | Min | G06Q 10/10 704/9 |
| 2014/0039878 A1* | 2/2014 | Wasson | G06F 40/40 704/9 |
| 2014/0052696 A1* | 2/2014 | Soroushian | H04N 21/482 707/691 |
| 2014/0062712 A1* | 3/2014 | Reiter | G06F 40/14 340/691.6 |
| 2014/0067377 A1* | 3/2014 | Reiter | G06F 40/169 704/9 |
| 2014/0072947 A1 | 3/2014 | Boguraev et al. | |
| 2014/0072948 A1* | 3/2014 | Boguraev | G09B 7/00 434/362 |
| 2014/0089212 A1* | 3/2014 | Sbodio | G06Q 10/10 705/311 |
| 2014/0100846 A1* | 4/2014 | Haine | G06F 40/186 704/9 |
| 2014/0100901 A1* | 4/2014 | Haine | G06Q 10/067 705/7.11 |
| 2014/0100923 A1* | 4/2014 | Strezo | G06Q 10/067 705/7.39 |
| 2014/0143720 A1* | 5/2014 | Dimarco | G06F 16/9535 715/810 |
| 2014/0149107 A1* | 5/2014 | Schilder | G06F 40/56 704/9 |
| 2014/0164303 A1 | 6/2014 | Bagchi et al. | |
| 2014/0164304 A1* | 6/2014 | Bagchi | G06N 5/02 706/46 |
| 2014/0188477 A1* | 7/2014 | Zhang | G10L 15/22 704/257 |
| 2014/0278358 A1 | 9/2014 | Byron et al. | |
| 2014/0281935 A1* | 9/2014 | Byron | G06F 40/177 715/249 |
| 2014/0281951 A1* | 9/2014 | Megiddo | G06F 40/253 715/271 |
| 2014/0297268 A1* | 10/2014 | Govrin | G06N 5/04 704/9 |
| 2014/0316768 A1* | 10/2014 | Khandekar | G06F 16/3329 704/9 |
| 2014/0328570 A1* | 11/2014 | Cheng | H04N 21/44008 386/241 |
| 2014/0358964 A1* | 12/2014 | Woods | G06F 16/3329 707/769 |
| 2014/0375466 A1 | 12/2014 | Reiter | |
| 2014/0379322 A1* | 12/2014 | Koutrika | G06F 8/73 704/2 |
| 2014/0379378 A1* | 12/2014 | Cohen-Solal | G06F 19/00 705/3 |
| 2015/0006437 A1* | 1/2015 | Byron | G06F 40/55 706/11 |
| 2015/0032443 A1* | 1/2015 | Karov | G06F 16/36 704/9 |
| 2015/0081307 A1* | 3/2015 | Cederstrom | G16H 15/00 704/260 |
| 2015/0081321 A1* | 3/2015 | Jain | G16H 20/10 705/2 |
| 2015/0095015 A1* | 4/2015 | Lani | G06F 40/56 704/9 |
| 2015/0106307 A1 | 4/2015 | Antebi et al. | |
| 2015/0142418 A1* | 5/2015 | Byron | G06F 40/232 704/9 |
| 2015/0142421 A1* | 5/2015 | Buurman | G06F 40/174 704/9 |
| 2015/0154359 A1* | 6/2015 | Harris | G16H 10/60 705/3 |
| 2015/0163358 A1* | 6/2015 | Klemm | G06F 16/248 379/88.01 |
| 2015/0169522 A1* | 6/2015 | Logan | G06F 40/166 715/256 |
| 2015/0169548 A1* | 6/2015 | Reiter | G06F 40/56 704/9 |
| 2015/0169659 A1* | 6/2015 | Lee | G06Q 10/10 707/746 |
| 2015/0169720 A1 | 6/2015 | Byron et al. | |
| 2015/0169737 A1* | 6/2015 | Byron | G06F 40/177 707/758 |
| 2015/0179082 A1* | 6/2015 | Byron | G09B 7/00 434/322 |
| 2015/0227508 A1* | 8/2015 | Howald | G06F 40/117 704/9 |
| 2015/0242384 A1* | 8/2015 | Reiter | G06F 40/169 715/202 |
| 2015/0261744 A1* | 9/2015 | Suenbuel | G06F 40/211 704/9 |
| 2015/0261836 A1* | 9/2015 | Madhani | G06F 16/355 707/602 |
| 2015/0279348 A1* | 10/2015 | Cao | G06F 16/288 704/258 |
| 2015/0310013 A1 | 10/2015 | Allen et al. | |
| 2015/0310112 A1* | 10/2015 | Allen | G06F 40/30 706/58 |
| 2015/0310861 A1* | 10/2015 | Waltermann | G10L 15/1815 704/275 |
| 2015/0324343 A1 | 11/2015 | Carter et al. | |
| 2015/0324347 A1* | 11/2015 | Bradshaw | G06F 40/40 704/9 |
| 2015/0324351 A1* | 11/2015 | Sripada | G06F 40/35 704/9 |
| 2015/0324374 A1* | 11/2015 | Sripada | G06F 16/24578 707/724 |
| 2015/0324413 A1* | 11/2015 | Gubin | G06F 16/2322 715/703 |
| 2015/0325000 A1* | 11/2015 | Sripada | G06F 40/40 382/103 |
| 2015/0326622 A1* | 11/2015 | Carter | G06F 3/0482 715/753 |
| 2015/0331845 A1 | 11/2015 | Guggilla et al. | |
| 2015/0331846 A1* | 11/2015 | Guggilla | G06F 40/205 704/9 |
| 2015/0332670 A1* | 11/2015 | Akbacak | G06F 40/40 704/9 |
| 2015/0347400 A1* | 12/2015 | Sripada | G06F 40/56 704/9 |
| 2015/0356127 A1 | 12/2015 | Pierre et al. | |
| 2015/0363363 A1 | 12/2015 | Bohra et al. | |
| 2015/0363364 A1* | 12/2015 | Sripada | G06F 16/95 715/243 |
| 2015/0363382 A1* | 12/2015 | Bohra | G06F 40/56 704/9 |
| 2015/0363390 A1 | 12/2015 | Mungi et al. | |
| 2015/0363391 A1* | 12/2015 | Mungi | G06F 40/211 704/9 |
| 2015/0371651 A1* | 12/2015 | Aharoni | G06F 40/56 704/201 |
| 2016/0019200 A1 | 1/2016 | Allen | |
| 2016/0027125 A1* | 1/2016 | Bryce | G06Q 40/12 705/30 |
| 2016/0055150 A1 | 2/2016 | Bird et al. | |
| 2016/0232152 A1* | 8/2016 | Mahamood | G06F 40/186 |
| 2016/0328385 A1 | 11/2016 | Reiter | |

(56) References Cited

U.S. PATENT DOCUMENTS

| | | | | |
|---|---|---|---|---|
| 2017/0235848 A1* | 8/2017 | Van Dusen | ............ | G06F 16/904 705/12 |
| 2018/0121560 A1* | 5/2018 | Chen | ...................... | G06F 16/444 |
| 2019/0220503 A1* | 7/2019 | Gelosi | ................... | G06F 40/131 |
| 2019/0272324 A1* | 9/2019 | Esposito | ................. | G06F 40/30 |
| 2020/0019592 A1* | 1/2020 | Dale | ....................... | G06F 40/284 |
| 2021/0157975 A1* | 5/2021 | Gelosi | ................... | G06F 40/166 |

FOREIGN PATENT DOCUMENTS

| | | |
|---|---|---|
| AU | 2013201755 A1 | 9/2013 |
| AU | 2013338351 A1 | 5/2015 |
| CA | 2577721 C | 3/2006 |
| CA | 2826116 C | 3/2006 |
| CN | 103999081 A | 8/2014 |
| CN | 104182059 A | 12/2014 |
| CN | 104881320 A | 9/2015 |
| EP | 1336955 B1 | 5/2006 |
| EP | 2707809 A1 | 3/2014 |
| EP | 2750759 A1 | 7/2014 |
| EP | 2849103 A2 | 3/2015 |
| GB | 2518192 A | 3/2015 |
| JP | 61-221873 A | 10/1986 |
| JP | 2004-21791 A | 1/2004 |
| JP | 2014165766 A | 9/2014 |
| WO | WO 2000/074394 A2 | 12/2000 |
| WO | WO 2002/031628 A2 | 4/2002 |
| WO | WO 2002/073449 A1 | 9/2002 |
| WO | WO 2002/073531 A1 | 9/2002 |
| WO | WO 2002/031628 A3 | 10/2002 |
| WO | WO 2006/010044 A2 | 1/2006 |
| WO | WO 2007/041221 A1 | 4/2007 |
| WO | WO 2009/014465 A2 | 1/2009 |
| WO | WO 2010/049925 A2 | 5/2010 |
| WO | WO 2010/051404 A1 | 5/2010 |
| WO | WO 2012/071571 A2 | 5/2012 |
| WO | WO 2013/009613 A1 | 1/2013 |
| WO | WO 2013/042115 A2 | 3/2013 |
| WO | WO 2013/042116 A1 | 3/2013 |
| WO | WO 2013/177280 A1 | 11/2013 |
| WO | WO 2014/035402 A1 | 3/2014 |
| WO | WO 2014/098560 A2 | 6/2014 |
| WO | WO 2014/140977 A1 | 9/2014 |
| WO | WO 2014/187076 A1 | 11/2014 |
| WO | WO 2015/028844 A1 | 3/2015 |
| WO | WO 2015/113301 A1 | 8/2015 |
| WO | WO 2015/148278 A1 | 10/2015 |
| WO | WO 2015/159133 A1 | 10/2015 |
| WO | WO 2015/164253 A1 | 10/2015 |
| WO | WO 2015/175338 A1 | 11/2015 |
| WO | WO 2016/004266 A2 | 1/2016 |

OTHER PUBLICATIONS

Andre et al., "From Visual Data to Multimedia Presentations," Grounding Representations: Integration of Sensory Information in Natural Language Processing, Artificial Intelligence and Neural networks, IEE Colloquium On, pp. 1-3, (1995).

Andre et al., "Natural Language Access to Visual Data: Dealing with Space and Movement," Report 63, German Research Center for Artificial Intelligence (DFKI) SFB 314, Project VITRA, pp. 1-21, (1989).

Barzilay et al.; "Aggregation via Set Partitioning for Natural Language Generation", Proceedings of the Human Language Technology Conference of the North American Chapter of the ACL; pp. 359-366; (2006).

Bhoedjang et al., "Optimizing Distributed Data Structures Using Application-Specific Network Interface Software," Parallel Processing, Proceedings; International Conference on Year: 1998, IEEE Conference Publications, pp. 485-492, (1998).

Cappozzo et al., "Surface-Marker Cluster Design Criteria for 3-D Bone Movement Reconstruction," IEEE Transactions on Biomedical Engineering, 44(12):1165-1174, (1997).

Chang-Jie et al., "Interactive Location-based Services Combined with Natural Language," International Conference on Wireless Communications, Networking and Mobile Computing, pp. 3015-3018, (2007).

Dalianis et al.; "Aggregation in Natural Language Generation;" Trends in Natural Language Generation, an Artificial Intelligence Perspective; pp. 88-105; (1993).

Dragon et al., "Multi-Scale Clustering of Frame-to-Frame Correspondences for Motion Segmentation," Computer Vision ECCV, Springer Berlin Heidelberg, pp. 445-458, (2012).

Gatt et al.,"From Data to Text in the Neonatal Intensive Care Unit: Using NLG Technology for Decision Support and Information Management," AI Communication, pp. 153-186, (2009).

Gorelov et al., "Search Optimization in Semistructured Databases Using Hierarchy of Document Schemas," Programming and Computer Software, 31(6):321-331, (2005).

Guoqiang et al., "The Research on Interactive short Message Response," Workshop on Intelligent Information Technology Application, IEEE Conference Publications pp. 206-209, (2007).

Herzog et al., "Combining Alternatives in the Multimedia Presentation of Decision Support Information for Real-Time Control," IFIP, 15 pages,(1998).

Kottke et al., "Motion Estimation Via Cluster Matching," 8180 IEEE Transactions on Pattern Analysis and Machine Intelligence, 16(11):1128-1132, (1994).

Kukich, "Knowledge-Based Report Generation: A Knowledge-Engineering Approach to Natural Language Report Generation," Dissertation to the Interdisciplinary Department of Information Science, University of Pittsburg, 260 pages, (1983).

Leonov et al., "Construction of an Optimal Relational Schema for Storing XML Documents in an RDBMS Without Using DTD/XML Schema," Programming and Computer Software, 30(6):323-336, (2004).

Perry et al., "Automatic Realignment of Data Structures to Improve MPI Performance," Networks (ICN), Ninth International Conference on Year: 2010, IEEE Conference Publications, pp. 42-47, (2010).

Premchaiswadi et al., "Enhancing Learning Systems by using Virtual Interactive Classrooms and Web-based Collaborative Work," Education Engineering (EDUCON) IEEE Conference Publications, pp. 1531-1537, (2010).

Quinlan, "Induction of Decision Trees," Machine Learning, Kluwer Academic Publishers, 1(1):81-106, (1986).

Radev et al.,"Generating Natural Language Summaries from Multiple On-Line Sources," Association of Computational Linguistics, 24(3):469-500, (1998).

Reiter et al., "Building Applied Natural Language Generation Systems," Natural Language Engineering 1 (1), 31 pages, (1995).

Reiter et al.; "Studies in Natural Language Processing—Building Natural Language Generation Systems," Cambridge University Press, (2000).

Reiter, "An Architecture for Data-to-Text Systems," Proceedings of ENLG-2007, pp. 97-104, (2007).

Shaw, "Clause Aggregation Using Linguistic Knowledge;" Proceedings of IWNLG, pp. 138-147, (1998). Retrieved from <http://acl.ldc.upenn.edu/W/W98/W98-1415.pdf>.

Spillner et al., "Algorithms for Dispersed Processing," Utility and Cloud Computing (UC), 204 IEEE/ACM 7th International Conference on Year: 2014, IEEE Conferenced Publications, pp. 914-921, (2014).

Takeuchi et al., "Human Prosocial Response to Emotive Facial Expression of Interactive Agent," The 15th IEEE International Symposium on Robot and Human Interactive Communication, pp. 680-685, (2006).

Voelz et al., "Rocco: A RoboCup Soccer Commentator System," German Research Center for Artificial Intelligence DFKI GmbH, 11 pages, (1999).

Yu et al., "Choosing the Content of Textual Summaries of Large Time-Series Data Sets," Natural Language Engineering, 13:1-28, (2007).

International Search Report and Written Opinion for Application No. PCT/IB2012/056513 dated Jun. 26, 2013.

(56) References Cited

OTHER PUBLICATIONS

International Search Report and Written Opinion for Application No. PCT/IB2012/056514 dated Jun. 26, 2013.
International Search Report and Written Opinion for Application No. PCT/IB2012/057773 dated Jul. 1, 2013.
International Search Report and Written Opinion for Application No. PCT/IB2012/057774 dated Sep. 20, 2013.
International Search Report and Written Opinion for Application No. PCT/IB2013/050375 dated May 7, 2013.
International Search Report and Written Opinion for Application No. PCT/US2012/053115 dated Jul. 24, 2013.
International Search Report and Written Opinion for Application No. PCT/US2012/053127 dated Jul. 24, 2013.
International Search Report and Written Opinion for Application No. PCT/US2012/053128 dated Jun. 27, 2013.
International Search Report and Written Opinion for Application No. PCT/US2012/053156 dated Sep. 26, 2013.
International Search Report and Written Opinion for Application No. PCT/US2012/053183 dated Jun. 4, 2013.
International Search Report and Written Opinion for Application No. PCT/US2012/061051 dated Jul. 24, 2013.
International Search Report and Written Opinion for Application No. PCT/US2012/063343; dated Jan. 15, 2014.
Notice of Allowance for U.S. Appl. No. 14/023,023 dated Apr. 11, 2014.
Notice of Allowance for U.S. Appl. No. 14/023,056 dated Apr. 29, 2014.
Notice of Allowance for U.S. Appl. No. 14/027,684 dated Mar. 21, 2016.
Notice of Allowance for U.S. Appl. No. 14/027,775 dated Aug. 12, 2015.
Notice of Allowance for U.S. Appl. No. 14/027,775 dated Sep. 10, 2015.
Office Action for U.S. Appl. No. 14/023,023 dated Mar. 4, 2014.
Office Action for U.S. Appl. No. 14/023,056 dated Nov. 21, 2013.
Office Action for U.S. Appl. No. 14/027,684 dated Oct. 6, 2015.
Office Action for U.S. Appl. No. 14/027,775 dated Jul. 13, 2015.
Statement in accordance with the Notice from the European patent Office dated Oct. 1, 2007 concerning business methods (OJ EPO Nov. 2007, 592-593, (XP002456414) 1 page.
U.S. Appl. No. 12/779,636; entitled "System and Method for Using Data to Automatically Generate a Narrative Story" filed May 13, 2010.
U.S. Appl. No. 13/186,308; entitled "Method and Apparatus for Triggering the Automatic Generation of Narratives" filed Jul. 19, 2011.
U.S. Appl. No. 13/186,329; entitled "Method and Apparatus for Triggering the Automatic Generation of Narratives" filed Jul. 19, 2011.
U.S. Appl. No. 13/186,337; entitled "Method and Apparatus for Triggering the Automatic Generation of Narratives" filed Jul. 19, 2011.
U.S. Appl. No. 13/186,346; entitled "Method and Apparatus for Triggering the Automatic Generation of Narratives" filed Jul. 19, 2011.
U.S. Appl. No. 13/464,635; entitled "Use of Tools and Abstraction in a Configurable and Portable System for Generating Narratives" filed May 4, 2012.
U.S. Appl. No. 13/464,675; entitled "Configurable and Portable System for Generating Narratives" filed May 4, 2012.
U.S. Appl. No. 13/464,716; entitled "Configurable and Portable System for Generating Narratives" filed May 4, 2012.
U.S. Appl. No. 14/023,023; entitled "Method and Apparatus for Alert Validation;" filed Sep. 10, 2013.
U.S. Appl. No. 14/023,056; entitled "Method and Apparatus for Situational Analysis Text Generation;" filed Sep. 10, 2013.
U.S. Appl. No. 14/027,684; entitled "Method, Apparatus, and Computer Program Product for User-Directed Reporting," filed Sep. 16, 2013.
U.S. Appl. No. 14/027,775; entitled "Method and Apparatus for Interactive Reports;" filed Sep. 16, 2013.
U.S. Appl. No. 14/914,461, filed Feb. 25, 2016; In re: Reiter et al., entitled Text Generation From Correlated Alerts.
U.S. Appl. No. 15/022,420, filed Mar. 16, 2016; In re: Mahamood, entitled Method and Apparatus for Document Planning.
U.S. Appl. No. 15/074,425, filed Mar. 18, 2016; In re: Reiter, entitled Method and Apparatus for Situational Analysis Text Generation.
U.S. Appl. No. 15/093,337, filed Apr. 7, 2016; In re: Reiter, entitled Method and Apparatus for Referring Expression Generation.
U.S. Appl. No. 15/093,365, filed Apr. 7, 2016; In re: Logan et al., entitled Method and Apparatus for Updating a Previously Generated Text.
Reiter, "Chapter 4: Document Planning (early draft), Building Natural Language Generation Systems," pp. 73-113, (2005). [Retrieved from the Internet Nov. 2, 2017: <http://www.ling.helsinki.fi/~gwilcock/Tartu-2003/ReiterDale/4-DocumentPlanning.pdf>].
Seki, "XML Transformation-based three-stage pipelined Natural Language Generation System," Proc. of 6th NLP Pacific Rim Symposium (NLPRS 2001), pp. 767-768, (2001). [Retrieved from the Internet Nov. 2, 2017: <http://www.afnlp.org/archives/nlprs2001/pd.
Wilcock, "An Overview of Shallow XML-Based Natural Language Generation," Baltic HLT, pp. 67-78, (2005). [Retrieved from the Internet Nov. 2, 2017: <https://www.ling.helsinki.fi/~gwilcock/Pubs/2005/BalticHLT-05.pdf>].
International Preliminary Report on Patentability for Application No. PCT/IB2012/056513 dated May 19, 2015.
International Preliminary Report on Patentability for Application No. PCT/IB2012/056514 dated May 19, 2015.
International Preliminary Report on Patentability for Application No. PCT/IB2012/057773 dated Jun. 30, 2015.
International Preliminary Report on Patentability for Application No. PCT/IB2012/057774 dated Jun. 30, 2015.
International Preliminary Report on Patentability for Application No. PCT/IB2013/050375 dated Jul. 21, 2015.
International Preliminary Report on Patentability for Application No. PCT/IB2013/058131 dated May 5, 2015.
International Preliminary Report on Patentability for Application No. PCT/IB2014/060846 dated Oct. 18, 2016.
International Preliminary Report on Patentability for Application No. PCT/US2012/053115 dated Mar. 3, 2015.
International Preliminary Report on Patentability for Application No. PCT/US2012/053127 dated Mar. 3, 2015.
International Preliminary Report on Patentability for Application No. PCT/US2012/053128 dated Mar. 3, 2015.
International Preliminary Report on Patentability for Application No. PCT/US2012/053156 dated Mar. 3, 2015.
International Preliminary Report on Patentability for Application No. PCT/US2012/053183 dated Mar. 3, 2015.
International Preliminary Report on Patentability for Application No. PCT/US2012/061051 dated Mar. 3, 2015.
International Preliminary Report on Patentability for Application No. PCT/US2012/063343 dated May 5, 2015.
International Search Report and Written Opinion for Application No. PCT/IB2013/058131 dated Jul. 3, 2014.
International Search Report and Written Opinion for Application No. PCT/IB2014/060846 dated Feb. 4, 2015.
Notice of Allowance for U.S. Appl. No. 14/311,806 dated Dec. 28, 2016.
Notice of Allowance for U.S. Appl. No. 14/311,998 dated Dec. 22, 2015.
Notice of Allowance for U.S. Appl. No. 14/311,998 dated Jan. 21, 2016.
Notice of Allowance for U.S. Appl. No. 14/634,035 dated Mar. 30, 2016.
Notice of Allowance for U.S. Appl. No. 15/421,921 dated Mar. 14, 2018.
Office Action for U.S. Appl. No. 14/311,806 dated Jun. 10, 2016.
Office Action for U.S. Appl. No. 14/311,998 dated Feb. 20, 2015.
Office Action for U.S. Appl. No. 14/311,998 dated Oct. 7, 2015.
Office Action for U.S. Appl. No. 14/634,035 dated Aug. 28, 2015.

(56) References Cited

OTHER PUBLICATIONS

Office Action for U.S. Appl. No. 14/634,035 dated Dec. 10, 2015.
Office Action for U.S. Appl. No. 14/634,035 dated Mar. 30, 2016.
Office Action for U.S. Appl. No. 14/760,848 dated May 11, 2017.
Office Action for U.S. Appl. No. 15/022,420 dated Feb. 13, 2018 .
Office Action for U.S. Appl. No. 15/022,420 dated May 18, 2017.
Office Action for U.S. Appl. No. 15/074,425 dated Feb. 26, 2018.
Office Action for U.S. Appl. No. 15/074,425 dated May 10, 2017.
Office Action for U.S. Appl. No. 15/186,927 dated Jul. 3, 2018.
Office Action for U.S. Appl. No. 15/186,927 dated May 1, 2017.
Office Action for U.S. Appl. No. 15/186,927 dated Nov. 17, 2017.
Office Action for U.S. Appl. No. 15/188,423 dated Jul. 20, 2018.
Office Action for U.S. Appl. No. 15/188,423 dated Oct. 23, 2017.
Office Action for U.S. Appl. No. 15/421,921 dated Sep. 27, 2017.
U.S. Appl. No. 14/311,806; entitled Method and Apparatus for Alert Validation; In re: Reiter, filed Jun. 23, 2014.
U.S. Appl. No. 14/311,998, entitled Method and Apparatus for Situational Analysis Text Generation; In re: Reiter; filed Jun. 23, 2014.
U.S. Appl. No. 14/634,035, entitled Method and Apparatus for Annotating a Graphical Output; In re: Reiter; filed Feb. 27, 2015.
U.S. Appl. No. 14/760,848, entitled Method and Apparatus for Document Planning; In re: Sripada; filed Jul. 14, 2015.
U.S. Appl. No. 15/188,423, filed Jun. 21, 2016; In re: Reiter, entitled Method and Apparatus for Annotating a Graphical Output.
U.S. Appl. No. 15/421,921, filed Feb. 1, 2017; In re: Reiter, entitled Method and Apparatus for Alert Validation.
U.S. Appl. No. 15/186,927; filed Jun. 20, 2016; In re: Sripada, entitled Method, Apparatus, and Computer Program Product for User-Directed Reporting.
Applicant Initiated Interview Summary for U.S. Appl. No. 14/822,349 dated Feb. 13, 2018.
Notice of Allowance for U.S. Appl. No. 14/634,074 dated Jun. 30, 2015.
Office Action for U.S. Appl. No. 14/634,074 dated Apr. 17, 2015.
Office Action for U.S. Appl. No. 14/822,349 dated Jan. 20, 2017.
Office Action for U.S. Appl. No. 14/822,349 dated Jun. 27, 2018.
Office Action for U.S. Appl. No. 14/822,349 dated Nov. 13, 2017.
Office Action for U.S. Appl. No. 14/822,349 dated Sep. 2, 2016.
U.S. Appl. No. 14/634,074, entitled Method and Apparatus for Configurable Microplanning; In re: Reiter; filed Feb. 27, 2015.
U.S. Appl. No. 14/822,349; entitled Method and Apparatus for Configurable Microplanning; In re: Reiter, filed Aug. 10, 2015.
Office Action U.S. Appl. No. 15/022,420 dated Sep. 28, 2018.

\* cited by examiner

METHOD AND APPARATUS FOR INTERACTIVE REPORTS

CROSS-REFERENCE TO RELATED APPLICATIONS

This application is a continuation of U.S. application Ser. No. 14/961,222, titled "METHOD AND APPARATUS FOR INTERACTIVE REPORTS," filed Dec. 7, 2015, which is a continuation of U.S. application Ser. No. 14/027,775, titled "METHOD AND APPARATUS FOR INTERACTIVE REPORTS," filed Sep. 16, 2013, now U.S. Pat. No. 9,244,894, the contents of which are incorporated herein by reference in their entirety.

TECHNOLOGICAL FIELD

Embodiments of the present invention relate generally to natural language generation technologies and, more particularly, relate to a method, apparatus, and computer program product for providing interactive reports.

BACKGROUND

Natural language generation (NLG) is sometimes referred to as a subfield of artificial intelligence and computational linguistics that focuses on the production of understandable texts in English or other understandable language. In some examples, a natural language generation (NLG) system is configured to transform raw input data that is expressed in a non-linguistic format into a format that can be expressed linguistically, such as through the use of natural language (e.g., the conversion from data to text). In some cases the data is high frequency numerical data. For example, raw input data may take the form of a value of a stock market index over time and, as such, the raw input data may include data that is suggestive of a time, a duration, a value and/or the like. Other examples, may include the generation of textual weather forecasts base on numerical weather prediction data. Therefore, an NLG system may be configured to input the raw input data and output text that linguistically describes the value of the stock market index; for example, "securities markets rose steadily through most of the morning, before sliding downhill late in the day." Importantly, for use in an NLG system, data must be analysed and interpreted in a way in which the analysis and interpretation can be linguistically communicated. For example, data that indicates the price of a stock market rising may be represent linguistically as rising, spiking or the like. A human may then make decisions based on how that human interprets rising versus spiking.

Data that is input into a NLG system may be provided in, for example, a recurrent formal structure. The recurrent formal structure may comprise a plurality of individual fields and defined relationships between the plurality of individual fields. For example, the input data may be contained in a spreadsheet or database, presented in a tabulated log message or other defined structure, encoded in a 'knowledge representation' such as the resource description framework (RDF) triples that make up the Semantic Web and/or the like. In some examples, the data may include numerical content, symbolic content or the like. Symbolic content may include, but is not limited to, alphanumeric and other non-numeric character sequences in any character encoding, used to represent arbitrary elements of information. In some examples, the output of the NLG system is text in a natural language (e.g. English, Japanese or Swahili), but may also be in the form of synthesized speech.

BRIEF SUMMARY

In some example embodiments, a computer implemented method is disclosed herein that includes identifying one or more messages to be hyperlinked in an output report, wherein the one or more messages are data structures that are configured to linguistically describe at least a portion of raw input data; determining one or more interactive responses based on the one or more messages to be hyperlinked; determining one or more words in a phrase specification that are related to the one or more messages to be hyperlinked; and generating the output report, wherein the one or more words are hyperlinked in the output report such that when selected at least one of the one or more interactive responses is performed.

In some example embodiments, an apparatus is disclosed herein that includes at least one processor; and at least one memory including computer program code, the at least one memory and the computer program code configured to, with the at least one processor, cause the apparatus to at least identify one or more messages to be hyperlinked in an output report, wherein the one or more messages are data structures that are configured to linguistically describe at least a portion of raw input data; determine one or more interactive responses based on the one or more messages to be hyperlinked; determine one or more words in a phrase specification that are related to the one or more messages to be hyperlinked; and generate the output report, wherein the one or more words are hyperlinked in the output report such that when selected at least one of the one or more interactive responses is performed.

In some example embodiments, a computer program product is disclosed herein that includes at least one computer readable non-transitory memory medium having program code instructions stored thereon, the program code instructions which when executed by an apparatus cause the apparatus at least to identify one or more messages to be hyperlinked in an output report, wherein the one or more messages are data structures that are configured to linguistically describe at least a portion of raw input data; determine one or more interactive responses based on the one or more messages to be hyperlinked; determine one or more words in a phrase specification that are related to the one or more messages to be hyperlinked; and generate the output report, wherein the one or more words are hyperlinked in the output report such that when selected at least one of the one or more interactive responses is performed.

In some example embodiments, an apparatus is disclosed herein that includes means for identifying one or more messages to be hyperlinked in an output report, wherein the one or more messages are data structures that are configured to linguistically describe at least a portion of raw input data; means for determining one or more interactive responses based on the one or more messages to be hyperlinked; means for determining one or more words in a phrase specification that are related to the one or more messages to be hyperlinked; and means for generating the output report, wherein the one or more words are hyperlinked in the output report such that when selected at least one of the one or more interactive responses is performed.

In some example embodiments, a computer implemented method is disclosed herein that includes displaying an output report having one or more hyperlinks surrounding one or more words, wherein the one or more hyperlinks provide an indication that an interactive response is available; receiving an indication of a selection of a hyperlink of the one or more hyperlinks; determining a communicative goal for a sentence having the hyperlink and a current context of the reader; and displaying an interactive response.

In some example embodiments, an apparatus is disclosed herein that includes at least one processor; and at least one memory including computer program code, the at least one memory and the computer program code configured to, with the at least one processor, cause the apparatus to at least display an output report having one or more hyperlinks surrounding one or more words, wherein the one or more hyperlinks provide an indication that an interactive response is available; receive an indication of a selection of a hyperlink of the one or more hyperlinks; determine a communicative goal for a sentence having the hyperlink and a current context of the reader; and display an interactive response.

In some example embodiments, a computer program product is disclosed herein that includes at least one computer readable non-transitory memory medium having program code instructions stored thereon, the program code instructions which when executed by an apparatus cause the apparatus at least to display an output report having one or more hyperlinks surrounding one or more words, wherein the one or more hyperlinks provide an indication that an interactive response is available; receive an indication of a selection of a hyperlink of the one or more hyperlinks; determine a communicative goal for a sentence having the hyperlink and a current context of the reader; and display an interactive response.

In some example embodiments, an apparatus is disclosed herein that includes means for displaying an output report having one or more hyperlinks surrounding one or more words, wherein the one or more hyperlinks provide an indication that an interactive response is available; means for receiving an indication of a selection of a hyperlink of the one or more hyperlinks; means for determining a communicative goal for a sentence having the hyperlink and a current context of the reader; and means for displaying an interactive response.

BRIEF DESCRIPTION OF THE DRAWINGS

Figure 1:
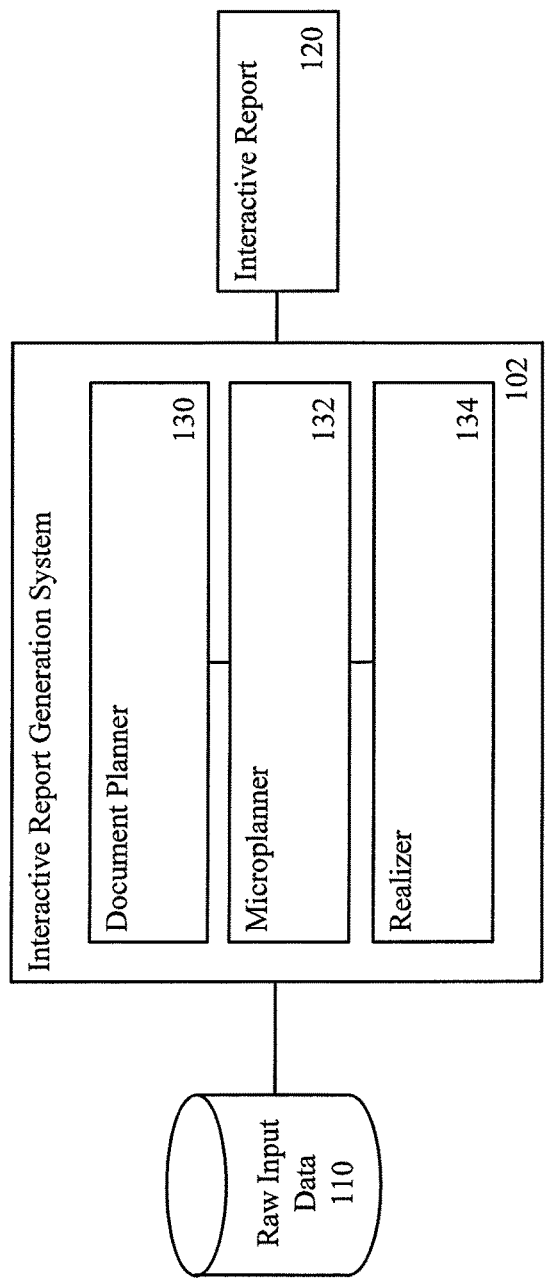
Figure 2:
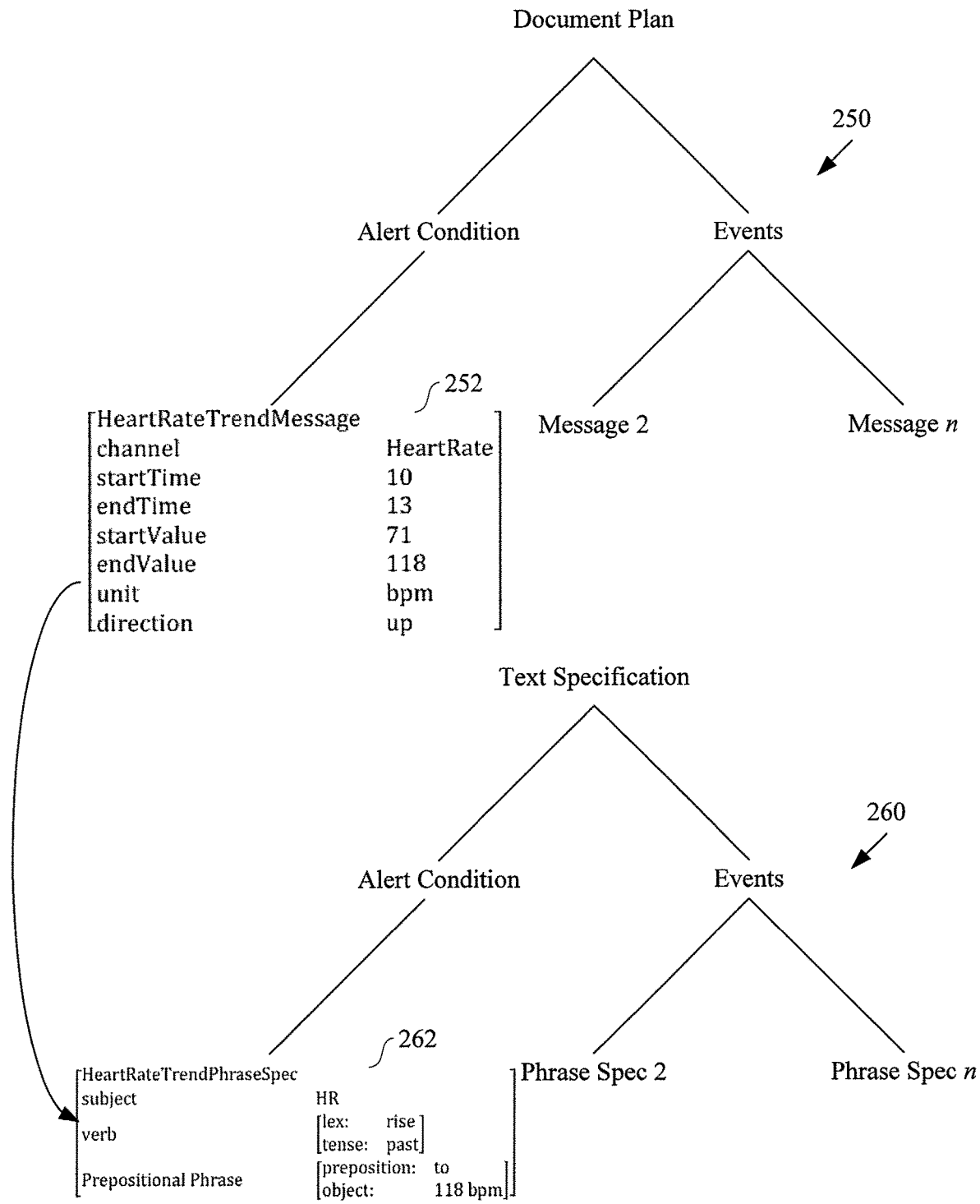
Figure 3:
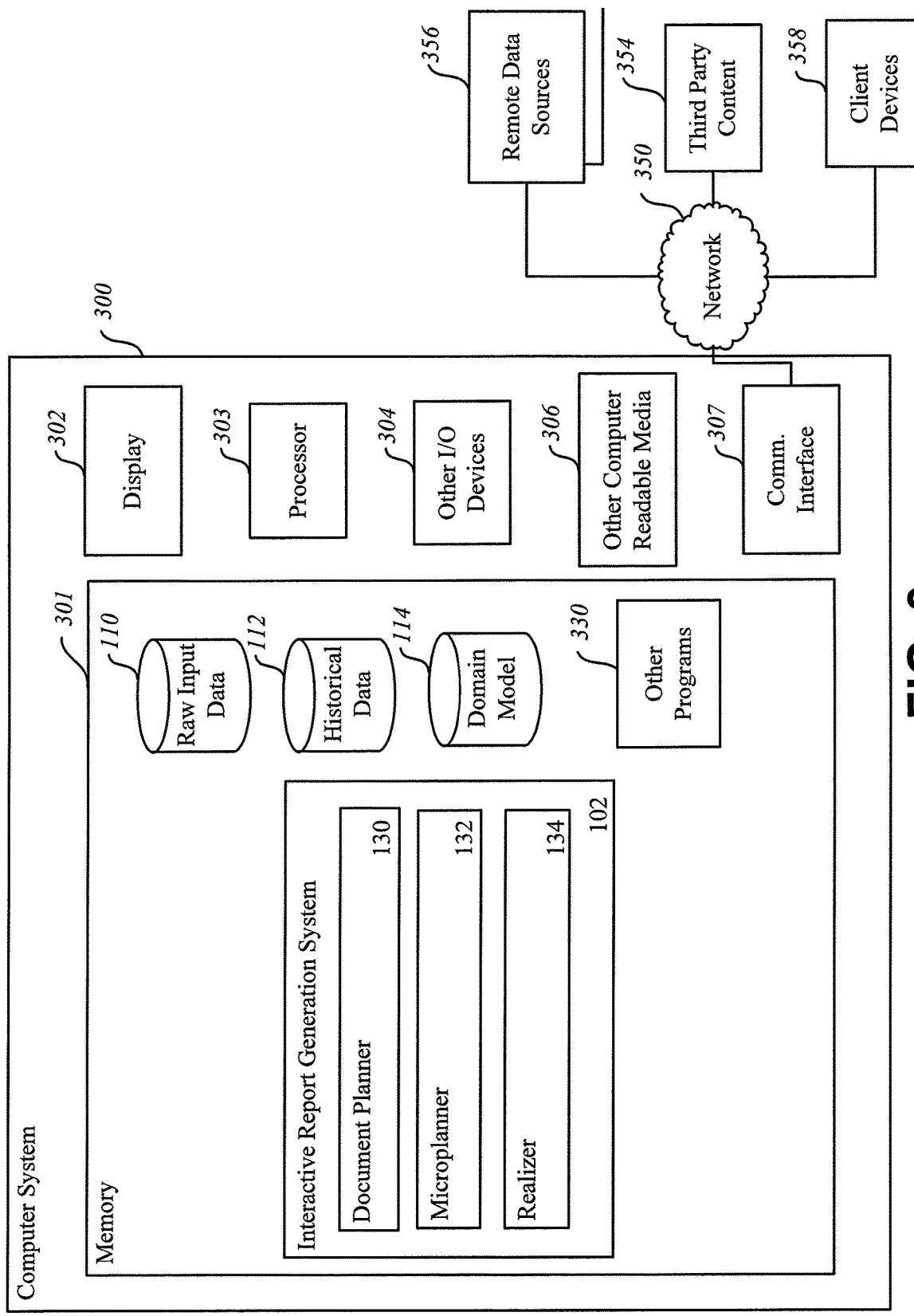

Having thus described embodiments of the invention in general terms, reference will now be made to the accompanying drawings, which are not necessarily drawn to scale, and wherein:

FIG. 1 is a schematic representation of an interactive report generation environment that may benefit from some example embodiments of the present invention;

FIG. 2 illustrates an example document plan tree and a text specification in accordance with some example embodiments of the present invention;

FIG. 3 illustrates a block diagram of an apparatus that embodies an interactive report generation environment in accordance with some example embodiments of the present invention; and FIGS. 4-7 illustrate flowcharts that may be performed by an interactive report generation environment in accordance with some example embodiments of the present invention.

DETAILED DESCRIPTION

Example embodiments will now be described more fully hereinafter with reference to the accompanying drawings, in which some, but not all embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

Overview

In NLG implementations, a distinction has been drawn between dialogic systems and monologic systems. A dialogic system may take the form of a dialog system, such as a speech telephony based system, where a user interacts with a machine either via text or voice and then that user may receive a text or voice response from the machine. The dialogue may continue, in some examples, until a particular result is reached or until the user or machine ends the interaction. Examples of monologic systems generally include NLG systems that may be configured to generate a report or generate some other form of text without interaction with the user or with limited interaction with the user (e.g., a request for a report to be generated). A traditional monologic system can be viewed as a short dialogue that comprises a user requesting a report and the system responding by generating the report. In a monologic NLG system that generates a textual report based on a dataset, there is generally a single question (e.g., generate a report) and a single answer (e.g., the report). In such systems, a user may be left with follow up questions to the report or may desire additional awareness of the situation (e.g., additional elaboration or context) described in the report.

As such, the methods and apparatus described herein are configured to generate interactive reports by generating NLG reports (e.g., answers) or interactive reports in such a way that enables a user to interact further with the NLG system. In some examples, an interactive report may be configured such that a user may click on a sentence in the report and, in response, have a graph generated that elaborates on the content of the sentence. For example, if a sentence that talks about how the temperature rose over some period of time is selected (e.g., the question), then a graph associated with the temperature rise may be displayed (e.g., the answer). Advantageously, by enabling the selection of the sentence and the subsequent generation of the graph, the methods and apparatus described herein have added a further conversational turn (e.g., a question and answer pair) to what otherwise may be a monologic NLG system In order to generate the interactive or subsequent response (e.g., the additional answer in the form of any one or more graphs, reports, speech, visualizations or the like) the method and apparatus are configured to generate or otherwise determine the communicative intent or goal of a particular portion of the output report. For example, a report may describe one or more data streams related to a compressor. In the example report, a sentence may be included that describes temperature readings over a period of time. Such a sentence might be displayed in the form of a hyperlink that functions like a request for further information in a dialog by generating a more detailed report about the temperature upon selection of the hyperlink or alternatively the sentence may be selectable through a graphical user interface, a user may interact with the sentence by selecting the type of response the user wants to receive (e.g., more detailed report, a report justifying the position taken in the sentence, voice output, pictorial representation, graph or the like) or the like. A selection of the sentence is, in some examples, a request to the NLG system to expand or otherwise elaborate on the content of the particular sentence. As such, the subsequent report may contain more elaborative responses, such as more detail on the temperature, an explanation of the importance of the temperature, a historical analysis of the temperature or the like.

In some examples, the methods and apparatus described herein may also take into account a context of the reader when generating subsequent responses (e.g., interactive response, another report or the like), such as what the reader has already read in the current report, historical reports, the last time the reader read about the particular piece of equipment described in the report or the like. As such, the method and apparatus described herein may generate subsequent responses based on the context of the portion of the text selected within the report, previously generated reports or the like. In other examples, context may include the context in which the reader analyzes information.

For example, a user may select a sentence related to a temperature of a compressor. In response to that interaction, the system may display a temperature graph but may also show the weather on that particular day, the temperature of a related compressor or the like in the same graph to provide the reader with context as to why the temperature sentence was important, to explain the temperature sentence, to provide the user with increased situational awareness or the like.

Context may also include not telling or not repeating in a subsequent response something that the reader has already been told. For example, if a user was previously told about or otherwise shown a related temperature in response to a previous click then that related temperature information may be omitted in the response to a subsequent click. In response to the subsequent click additional or alternate information may be described. In some examples, the additional information may be generated from messages not included in an original document plan.

In another example, a graphical output may be dynamically generated based on the context (e.g., based on data captured or otherwise defined by the one or more messages that were used to generate the portion of text selected). For example, if a report describes a stock portfolio by talking about how the portfolio performed and then it talks about individual stocks, if a user clicks on the text in the beginning of the report that talks about portfolios, a graph may be displayed that has a line or other indication of a performance for each stock. Whereas, if the same user did not click on the description of the portfolio but instead just selected the particular stock later in the report, that particular stock may be displayed with the remaining stocks in the portfolio or a graphical representation of the portfolio performance displayed in the background. As such, the resulting graph generated may be different depending on what graphs have already been shown to the user.

In some examples, portions of the output text may be highlighted, underlined or otherwise indicative (e.g., by using meta-tags) of an ability to be selected to enable elaboration. For example, a sentence may state that the temperature rose steeply between 5 am and 6 am. In one example, the entire sentence might be a hyperlink and clicking on the hyperlink that is tied to that text is considered to be a request for the NLG system to produce a subsequent report to explain temperature rise. However, in another example, only the terms '5 am and 6 am' could be hyperlinked such that a graph may be displayed showing temperatures at a given time or alternatively may provide context to explain any related details of the temperature at the selected time. In other cases, the selection of a word or phrase may provide for the definition of the word or phrase in the context that the word or phrase is used in the report. In further examples, the selection of sentence might be equivalent to a request to explain the sentence or justify the claim made in the sentence. Each type of response provided by the NLG system may be defined by the system or may, in some examples, be defined by the user.

Natural Language Generation System

FIG. 1 is an example block diagram of example components of an example interactive report generation environment 100 that may take the form of, for example, a code module, a component, circuitry and/or the like. The components of the interactive report generation environment 100 are configured to provide various logic (e.g. code, instructions, functions, routines and/or the like) and/or services related to the generation of interactive reports. In some example embodiments, a natural language generation system, such as interactive report generation system 102, is configured to generate phrases, sentences, text or the like which may take the form of natural language text based on raw input data 110 and output the phrases, sentences, text or the like in the form of interactive reports 120 (e.g., output reports). The interactive report generation system 102 comprises a document planner 130, a microplanner 132 and/or a realizer 134. Other natural language generation systems may be used in some example embodiments, such as a natural language generation pipeline as described in Building Natural Language Generation Systems by Ehud Reiter and Robert Dale, Cambridge University Press (2000), which is incorporated by reference in its entirety herein.

In some examples, interactive report generation system 102 may be configured to populate or otherwise instantiate one or more messages based on data or information in a primary data feed, the one or more related data feeds, the historical data, the contextual data feed, one or more events and/or the like. In some examples, messages are language independent data structures that correspond to informational elements in a text and/or collect together underling data in such a way that the underlying data can be linguistically expressed. In some examples, messages are created based on a requirements analysis as to what is to be communicated for a particular scenario (e.g. for a particular domain). A message typically corresponds to a fact about the underlying data (for example, the existence of some observed event) that could be expressed via a simple sentence (although it may ultimately be realized by some other linguistic means). For example, to linguistically describe wind, a user may want to know a speed, a direction, a time period or the like, but also the user wants to know changes in speed over time, warm or cold fronts, geographic areas and or the like. In some cases, users do not even want to know wind speed; they simply want an indication of a dangerous wind condition. Thus, a message related to wind speed may include fields to be populated by data related to the speed, direction, time period or the like, and may have other fields related to different time points, front information or the like. The mere fact that wind exists may be found in the data, but to linguistically describe "light wind" or "gusts" different data interpretation must be undertaken as is described herein.

In some examples, a message is created by the interactive report generation system 102 in an instance in which the data in the one or more data feeds, may warrant the construction of such a message. For example, a wind message would only be constructed in an instance in which wind data was present in the raw input data. Alternatively or additionally, while messages may correspond directly to observations taken from the raw data input, others, however, may be derived from the observations by means of a process of inference. For example, the presence of rain may be indicative of other conditions, such as the potential for snow at some temperatures.

In some example embodiments, one or more messages may be identified or otherwise be predefined to define or otherwise include information that indicates which of the one or more messages are to be interactive (e.g., a flag, an indicator bit or the like) when realized. In other words, when realized, the identified message or messages may be selected by the user, such as via a hyperlink, to prompt the interactive response described herein. The messages may be marked based on a marking specification (e.g., a set of rules that defined the messages that are be hyperlinked) as defined by the domain model, based on an expert system or the like. In other examples, messages may be dynamically identified for hyperlinking based on a determined importance level, based on one or more features in one or more received data channels, based on a learning system or the like.

The concepts and relationships that make up messages may be drawn from an ontology (e.g. a domain model) that formally represents knowledge about the application scenario. For example, message structures may be defined by the domain model 114 based on a particular alert condition and/or the raw input data, such as but not limited to the primary and/or related data feeds. Messages may also be derived from another data structure, may be user defined and/or the like. Each type of message may also be represented by a message template, which expresses a relationship between instances of a number of concepts; the message template contains slots which may be filled in, or instantiated, using particular values that are derived from the raw input data.

As such, the interactive report generation system 102 is configured to instantiate a plurality of messages based on the one or more data feeds, such as the one or more data feeds received via raw input data 110. In order to instantiate the one or more messages, the importance level of each of the messages and relationships between the messages, the interactive report generation system 102 may be configured to access the domain model directly or indirectly. The domain model may contain information related to a particular domain or industry. In some examples, the domain model may provide importance levels, single data feed limits related to normal behaviors in a domain (e.g. normal ranges), information related to anomalous behaviors and/or the like. In other examples, the domain model may describe relationships between various events and/or phenomena in multiple data feeds. For example in a weather domain, a domain model may indicate or otherwise instantiate an extreme weather message in an instance in which wind speeds that are related to hurricane type events or temperatures that may cause harm to humans or other animals or may cause damage or interference to shipping are present in the data. The extreme weather message may then be labeled as important, whereas typical temperatures or a typical wind message may not be marked as important in some examples.

Alternatively or additionally, the domain model may be configured to contain or otherwise have access to the diagnostic model.

In some example embodiments, the interactive report generation system 102 may be configured to annotate messages with an indication of their relative importance; this information can be used in subsequent processing steps or by the interactive report generation system 102 to make decisions about which information should be conveyed and which information may be suppressed, such as by using the domain model. In some examples, marking a message with as being related to a downstream hyperlink may be related to the importance level. The interactive report generation system 102 may assign an importance level to the one or more messages based on the pattern itself (e.g. magnitude, duration, rate of change or the like), defined constraints (e.g. defined thresholds, constraints or tolerances), temporal relationships between the pattern in the primary data feed and patterns in other related data feeds and/or the like. For example, a heart rate over 170 beats per minute, or 100 mile per hour winds, may be assigned a high level of importance. In some examples, messages that describe other patterns and/or constraints may be defined by the domain model. Alternatively or additionally, the interactive report generation system 102 may also be configured to annotate messages with information about how they are related to each other; for example, the interactive report generation system 102 might indicate that an event described in one message is assumed to have been caused by the event described in another message.

Using the importance level, the interactive report generation system 102 may assign certain ones of the messages that describe or are otherwise are instantiated with patterns or other data in the primary data feed as including key events. A key event may be selected or otherwise identified based on a pre-determined importance level threshold, such as a threshold defined by a user, a constraint defined by the domain model, or the like. Alternatively or additionally, key events may be selected or otherwise identified based on those patterns in the primary data feed with the highest level of importance, those patterns that exceed or otherwise satisfy the pre-determined importance level threshold and/or the like. For example, a domain model or user preference may indicate that any messages having wind readings over 50 miles per hour may be designated as key events, whereas in other examples only a message with highest wind reading over a defined time period may be a determined to include a key event. In further examples, the importance level determination may be performed over a plurality of time scales that may be user defined, defined by the domain model or the like (e.g., one hour, one day, one week, one month and/or the like).

In some example embodiments, the interactive report generation system 102 may also be configured to determine the importance of messages that describe patterns or events detected in one or more secondary or related data feeds. In some examples, the interactive report generation system 102 may determine one or more messages that describe patterns or events in the related data feeds that overlap time-wise or occur within the same time period as the patterns in the primary data feed. For example, during the same time period as rain is detected, another data feed may detect temperature falling below the freezing point. The interactive report generation system 102 may then mark the one or more messages that describe patterns or events in the related channels as important, expected, unexpected or as having or not having some other property based on the domain model.

For example, the domain model may suggest that the one or more patterns in the related data feed were expected to rise as they did in the primary channel. By way of example, as winds are rising, a wave height may then be expected to rise. In other cases, the behavior of the one or more related channels may be unexpected or may be anomalous when compared to the behavior of the primary data feed.

The one or more messages may be marked as including significant events based on the importance level, domain model, constraints, user settings or the like. For example, messages that include patterns or events in the related data feed that have an importance level above a predetermined threshold defined by the domain model, a user or the like, and may be marked as including significant events. In some example embodiments, messages including unexpected patterns or messages may also be categorized as significant events as they are suggestive of a particular condition or fault. Other messages including patterns or events may be determined to be significant events based on one or more constraints on channel value (e.g. expected range of values or the like), data anomalies, patterns marked as neither expected or unexpected that satisfy an importance level, and/or the like.

In some example embodiments, the interactive report generation system 102 may also be configured to determine the importance of messages built or otherwise instantiated using historical data, such as historical data, background information, event data, and/or the like. For example, historical data may contain information related to a previous condition and the actions taken or a result.

In further example embodiments, the interactive report generation system 102 may be configured to generate one or more messages based on determined or otherwise inferred events from the one or more data feeds, historical data, event data and/or the like. Events may include specific activities that may influence the one or more key events and/or may have caused the one or more significant events. In some examples, the one or more events may be inferred based in context with the one or more patterns in the primary and/or related data feeds. Alternatively or additionally events may be provided as a separate channel, such as a contextual data feed or may be provided directly to the interactive report generation system 102.

In some examples, raw input data may be received, such as the data in the following table, that illustrates a primary data feed (e.g. heart rate) and a related data feed (e.g. respiration rate):

| Time | Heart Rate | Respiration Rate |
|---|---|---|
| 1 | 68 | 14 |
| 2 | 72 | 15 |
| 3 | 70 | 14 |
| 4 | 70 | 14 |
| 5 | 69 | 16 |
| 6 | 72 | 15 |
| 7 | 73 | 16 |
| 8 | 68 | 13 |
| 9 | 70 | 14 |
| 10 | 71 | 15 |
| 11 | 90 | 14 |
| 12 | 110 | 14 |
| 13 | 118 | 14 |
| 14 | 116 | 15 |
| 15 | 105 | 15 |
| 16 | 92 | 14 |
| 17 | 86 | 13 |
| 18 | 80 | 14 |
| 19 | 75 | 14 |
| 20 | 72 | 15 |
| 21 | 70 | 14 |
| 22 | 71 | 13 |
| 23 | 69 | 13 |
| 24 | 71 | 14 |

As is demonstrated by the raw input data in the table above, heart rate went above 115 beats per minute (bpm) at time point 13, thus causing an alert condition. An indication of an alarm condition may be received, such as by a patient monitoring system, patient monitoring equipment and/or based on the determination that the data indicates an alert situation. In response to the alert condition, the heart rate data feed may be designated the primary data feed. In other embodiments, a user, the domain model or the like may indicate that the primary data feed is the heart rate data feed. In some example embodiments, the rapid change of heart rate between time point 10 and time point 11 lasting to time point 15 may be detected for use by the interactive report generation system 102.

A secondary or related data feed (e.g. respiration rate) may be determined to have a pattern (e.g. no change when a change is generally expected) in a corresponding time period. In some examples, the corresponding time period may be the same time period or may be a later time period when compared to the time period of the key events. Further, the corresponding time period may, in some examples, be defined by a domain model, such as domain model. In some example embodiments, the relatively flat and/or steady respiration rate between time point 10 and time point 15 may be abstracted for use by the interactive report generation system 102.

In some example embodiments, the interactive report generation system 102 is configured to generate one or more messages based on the raw input data in the one or more data feeds. Using the heart rate example, a message may include portions of the raw input data, to include abstractions of the data, but may also include additional distinctions necessary for the generation of text as the raw input data is likely to be insufficient for such a purpose. For example, a HeartRateSpike message may be instantiated using the raw input data and such a message may include: a time and relative variation in terms of heart rate change or peak heart rate, a time period and a direction. In some examples, another message may be generated on related channels, historic data, events and/or the like. In some examples, the HeartRateSpike message may be related to an Alert Message that contains information relating to the alert itself. For example, in an instance in which caffeine was applied prior to the heart rate spike, a message may be generated to identify such an event. Such a message may be an Event message that is instantiated with an event time and an event description, such as from the event log 116; for example, a message that indicates that caffeine had been orally administered prior to the spike in heart rate. Other messages such as RespirationRate (e.g. respiration rate stable=yes), HeartRateAlertHistorical (e.g. previous alert condition quantity=2, time=yesterday), HeartRateHistorical (e.g. heart rate trend=no change, time period=10 days) may be instantiated to include information about the related data feeds and/or historical data. Alternatively or additionally, the interactive report generation system 102, the document planner 130 and/or the like may be configured to generate the one or more messages. In some examples, the one or more of the HeartRateSpike message, RespirationRate, HeartRateAlertHistorical, HeartRateHistorical may be marked so as to be hyperlinked in the output text.

The document planner 130 is configured to input the one or more messages that are generated and/or instantiated by the interactive report generation system 102. The document planner 130 is further configured to determine how to arrange those messages to describe the patterns in the one or more data feeds derived from the raw input data. The document planner 130 may comprise a content determination process that is configured to select the messages, such as based on the decisions of the recommendation and diagnosis processor.

The document planner 130 may also comprise a structuring process that determines the order of messages to be included in a natural language text. In some example embodiments, the document planner 130 may access one or more text schemas for the purposes of content determination and document structuring. A text schema is a rule set that defines the order in which a number of messages are to be presented in a document. For example, an event message (e.g. medication injection) may be described prior to a key event message (e.g. rise in heart rate). In other examples, a significant event message (e.g. falling respiration rate) may be described after, but in relation to, a key event message (e.g. rise in heart rate). By way of further example a document plan may include, but is not limited to, an AlertMessage, a HeartRateSpike message and then a RespirationRate message. An Event message, HeartRateAlertHistorical message and HeartRateHistorical message may then follow in the example document plan.

In other examples, the document planner may define one or more messages to be interactive messages. In such an example, the document planner may comprise logic that flags or otherwise identifies certain messages for hyperlinking if they are present in the message store based on the marking specification or the like. For example, the document planner may flag a temperature spike message, a historic service call message or the like for hyperlinking, if it is present in the message store and is included in the document plan.

In further examples, the document plan may further define the resultant action when one or more hyperlinks are selected. In other words, the document plan may define (e.g., messages to be included in the interactive response the arrangement thereof) the communicative goal of a particular message and therefore define an interactive response. For example, the document plan may include a section relating to historical activity of a particular piece of equipment. Such a section may be realized as a single sentence in the initial report. The document plan may also contain additional detail on what would be included in a subsequent text and how a subsequent text may be arranged should the user select the sentence on historical activity via a hyperlink.

Alternatively or additionally, the document plan may identify that a graph is to be generated in response to a selection of a temperature spike message. The document plan may therefore define the scale, content and the like of the graph. Alternatively or additionally, the document plan may identify messages that were not included in the document plan and provide a user with a hyperlink to information in the data that was not included in the document plan.

The output of the document planner 130 may be a tree-structured object or other data structure that is referred to as a document plan. In an instance in which a tree-structured object is chosen for the document plan, the leaf nodes of the tree may contain the messages, and the intermediate nodes of the tree structure object may be configured to indicate how the subordinate nodes are related (e.g. elaboration, consequence, contrast and/or the like) to each other. A sample document plan may include, but is not limited to, document plan 250 of FIG. 2. Document plan 250 may include but is not limited to one or more messages, such as message 252.

In some example embodiments, the microplanner 132 is configured to modify a document plan, to create a text specification for input into a realizer. As is shown in some examples, a document plan may contain one or more leaf nodes that contain messages. An example message may comprise a plurality of slots that contain a named attribute and a value (e.g. channel and "HeartRate"). A message may also comprise slots that contain a named attribute and a set of named attributes and their values. Other messages may include additional named attributes and values.

Initially and in some example embodiments, the text specification may include a tree structure that matches or is otherwise structured in the same or similar manner as a document plan tree. In some examples, one or more messages may be combined (e.g. one or more document plan nodes) to form a single phrase specification (e.g. to form a single text specification node). Each leaf node of a text specification may include a phrase specification with one or more empty elements. The microplanner 132 may be configured to populate those element values by applying genre parameters, lexicalization rules, reference rules, aggregation rules and the like.

In some example embodiments, the microplanner 132 may be configured to input a series of genre parameters that are representative of genre conventions. Genre conventions are rules about the use of language which apply throughout texts in that particular genre. In some examples, however, the rules may be overridden by a user, by lexicalization rules and/or the like. The genre conventions specify default behavior for the realizer so that these aspects of language use do not have to continually re-specified by a user. Examples of genre parameters include, but are not limited to, the particular tense (e.g. past, present or future) that should be used consistently throughout the text to be generated; a convention on the use of pronouns in the text to be generated; and/or a convention as to whether or not abbreviated names are to be used in the text to be generated. Alternatively or additionally, other elements of the phrase specification may be set by the one or more genre conventions.

Genre conventions may be applied by the microplanner 132 as a first step in the initialization of the phrase specification that corresponds to an individual message. In such a case, subsequently applied lexicalization rules may override the results of application of the genre parameters. Alternatively or additionally, genre parameters may be applied by the microplanner 132 once all the lexicalization rules have been applied to a given message. In such a case, the genre parameters are configured to populate the elements of the phrase specification that have not been specified or otherwise populated by the lexicalization rules. For example, a tense equal to past, may be set by genre parameter and/or a lexicalization rule.

In additional example embodiments, one or more lexicalization rules may be input. Lexicalization rules are rules that determine how the content of individual messages may be mapped into phrase specifications. In some examples, lexicalization rules may include, but are not limited to, message-level rules that are configured to apply to messages as a whole. Lexicalization rules may also be configured to apply to one or more slots within each message. For example, message-level rules may specify how the overall form of a phrase is to be constructed from the contents of a message (e.g. heart rate is rising, falling or staying steady). Slot-level rules may specify how specific kinds of entities that are present in a message should be described (e.g. heart rate is expressed via a prepositional phrase such as "to 118 bpm") or otherwise referred to (e.g. refer to a machine by its machine ID or full machine title). For example a message-level rule may map a name value and high rate value from a message to a phrase specification.

For a given domain, there may be at least one message-level lexicalization rule for each type of message in the ontology for that domain that may be applied b. The one or more lexicalization rules for a message type define one or more constraints that are configured to test the message itself, the discourse model (e.g. a model that is configured to store the relevant aspects of the discourse context, such as a list of entities mentioned in the text so far, and the lexicalization of the previous sentence in a text), parameters set by the document planner 130 and/or the genre parameters. In an instance in which the one or more lexicalization rules matches the constraints, a default lexicalization rule may be defined for each message type and/or slot type.

In one example, a message-level rule may be configured to specify a canned text string to be used whenever a message of the specified type is received as input. For example, a GREETING message might result in the simple text string "Hello friend". Message-level lexicalization rules may also be configured to assign the contents of the slots of a message to particular syntactic constituents (e.g. a word or group of words that function as a single unit, such as a noun phrase, a verb phrase, a prepositional phrase or the like, within a hierarchical structure) in a sentence as represented by a phrase specification. For example, a lexicalization rule, or the one or more lexicalization rules, may be configured to specify the verb to be used to express a particular type of message, and slots in the message might be assigned to the subject and object positions in the sentence. In some examples, a user may allocate information in the one or more slots of a message to the elements of a phrase specification by using the following non-exhaustive list of syntactic constituents, subject: typically the first position in the sentence; verb: the main action described in the sentence; object: typically the position following the verb; indirectobject: used in those cases where a verb has three arguments, as in "John gave the cat a bath"; frontmodifier: used to provide information that will be placed at the beginning of the sentence, as in "yesterday, John gave the cat a bath"; premodifier: used to provide information that will be placed immediately in front of the verb, as in "John reluctantly gave the cat a bath"; postmodifier: used to provide information that will be placed immediately after the object, as in "John took a bus to the city" and/or the like. Alternatively or additionally, a slot-level rule may be configured to specify a canned text string when a slot of a specified type is received and/or specify a slot to be mapped to a particular syntactic constituent in a sentence as represented by a phrase specification.

Alternatively or additionally, a message-level rule may also specify particular syntactic features of the sentence to be generated, such as by overriding default values for those features either as provided by the realizer itself or by the genre parameters. Typical features include but are not limited to tense, which may be set to PAST, PRESENT or FUTURE; aspect, which may be set to PERFECTIVE or PROGRESSIVE; passive, which may be set to either TRUE or FALSE; negation and/or the like. In some example embodiments, a slot-level rule may specify a particular feature of a sentence to be generated, such as by overriding a default value. Alternatively or additionally, tense and aspect may be computed, such as by using a Reichenbachian model which is based on the time of the message (e.g. when the event described by the message happened), the time the text is generated, and/or a reference time. In some examples, reference time can be computed using one or more of the following non-exhaustive list: setting a reference time to the time of the previous message in the text specification, setting the reference time as the time of the first message expressed in a current paragraph and/or the like.

In some example embodiments, the microplanner may also apply slot-level rules. Slot-level rules may be applied to each slot in each message to enable the slot to be mapped to an element of a phrase specification. In some example embodiments, the message-level rules described herein may also be expressed as slot-level rules, allowing recursive embedding. However, in some examples the value of the slot itself may be used to fill corresponding element in a phrase specification.

In some examples, the microplanner is configured to determine whether two or more phrase specifications can be combined together linguistically to produce a more complex sentence. For example, one or more other phrase specifications may be combined with phrase specification to form a more complex sentence. In some examples, a reference system is configured to determine how to refer to an entity so that it can be unambiguously identified by the reader. For example, in a first sentence "John Smith" may be used where "he" or "his" may be used in subsequent sentences.

Alternatively or additionally, a slot-level rule may be executed. In such cases, the slot-level rule may specify how the value of the slot should be described based on the reference rules. Possible reference rules include, but are not limited to, StringValue: indicating that a string value associated with the object should be used to refer to the object; NamedEntity: indicating that a predefined reference strategy for named entities should be used to refer to the object and may include the choice between a full name or description, a reduced form of description, or a pronoun, on the basis of information about the other entities that have been referred to in the text; NumericValue: indicating that a predefined strategy for referring to numeric values should be used; TimeValue: indicates that a predefined reference strategy for referring to time values should be used to refer to the object; DurationValue: indicating that a predefined reference strategy for referring to durations should be used to refer to the object; EnumValue: indicating how specific values of an enumerated type should be expressed and/or the like.

In some example embodiments, the microplanner may also use a slot-level rule to specify content for each of a number of syntactic constituents within a linguistic element that is to be realized as a noun phrase. For example, the following non-exhaustive example list of positions may be available: determiner, specifier, noun, modifier, premodifier, postmodifier and/or the like. In some examples, a slot-level rule may also contain conditions that determine its applicability; amongst other things, these may be used to determine when the rule should have a null output, resulting in the constituent being elided in the sentence being planned.

In some example embodiments, the microplanner may also use one or more slot-level rules to specify syntactic features. For example, a slot level rule may specify the following non-exhaustive example list of syntactic features:

a pronominal (e.g. force a use of a pronoun), number (e.g. singular or plural), an indication of definite or indefinite and/or the like.

In some examples, after one or more messages have been marked as having a hyperlink at the message level or in the document planner level, a microplanner may be configured to select the particular words, phrases or the like to be hyperlinked:

1. If, for example, there is a single message realized in a sentence.
   a. Hyperlink the entire sentence in some examples.
2. If, for example, there are two or more messages that are realized in a sentence
   a. For each sentence, in some examples:
      i. Identify a subset of noun phrases, verb phrases and/or other sentence constituents that correspond to a particular message based on one or more predetermined conditions; and/or
      ii. Hyperlink the selected noun phrases, verb phrases and/or other sentence constituents.

In other examples, words, phrases, sentence constituents or the like may be individually hyperlinked. In some cases, the hyperlink may provide a technical definition based on the context of the report, whereas other examples may include historical information for a particular entity, etc. As such, one or more lexicalization rules may be used to enable hyperlinking for the word, phrase, sentence constituent, or the like. For example, a lexicalization rule may hyperlink each entity (e.g., a piece of equipment based on a defined hierarchy). In other examples, a lexicalization rule may identify particular sentence constituents based on a listing of terms that are available to be defined, based on a listing of available additional media (e.g., additional pictures, graphs or the like), or the like.

The output of the microplanner 132, in some example embodiments, is a tree-structured text specification whose leaf-nodes are phrase specifications, and whose internal nodes express rhetorical relations between the leaf nodes. A tree-structured text specification may include, but is not limited to text specification 260 of FIG. 2, having one or more phrase specifications, such as phrase specification 262. A phrase specification may correspond to a sentence or a sub-sentence fragment (e.g. a title) and are produced from one or more messages. A phrase specification is configured to contain one or more syntactic constituents (e.g. subject, verb, prepositional phrase and/or the like) and one or more syntactic features (e.g. tense).

A realizer 134 is configured to traverse the tree-structured text specification to express the tree-structured text specification in natural language. The realization process that is applied to each phrase specification in a text specification makes use of a grammar which specifies the valid syntactic structures in the language and further provides a way of mapping from text specifications into the corresponding natural language sentences. The output of the process is, in some example embodiments, a well-formed natural language text. In some examples, the natural language text may include embedded mark-up. The output of the realizer 134, in some example embodiments, is the output text, interactive response, interactive report or the like. The realizer may also output situational analysis text or a narrative that is configured to describe or otherwise summarize the one or more key events, the one or more significant events, the one or more contextual data feed s, and/or the one or more events.

In some examples, once realized, the report may be shown a screen via a user interface. The user interface may provide for a hyperlink, such as based on the word selection by the microplanner, in the form of an underline, box or the like. The hyperlink may be selectable, in some example embodiments, and may generate the interactive response, such as another text graph or the like. Alternatively or additionally, the hyperlink may provide a menu of potential responses in response to a click, thus prompting the user to determine whether a graph or text is desired. In some examples, the interactive response is dynamically generated based on the user's selection, whereas in other examples it may be generated, but not displayed, at the same time as the initial report.

By way of example, the realizer may output the following text in response to the text specification shown above (this example including one or more hyperlinks indicated by the underlined text):

John Smith's heart rate monitor sounded an alarm at 10.56 because his heart rate went above 115 beats per minute (bpm). His respiratory rate and oxygen saturation did not change. Caffeine, which can affect heart rate, had been orally administered to John at 10.54. This alarm had gone off twice yesterday, but in both cases heart rate quickly reverted to 70 bpm. John's heart rate has not shown any long-term upward or downward trends since he was admitted 10 days ago. John's heart rate increase was likely caused by the administration of the caffeine.

By way of further example, a selection of "heart rate went above 115 beats per minute" may result in a graph that illustrated heart rate over time, a text explaining heart rate over time or both. In other examples, selecting "alarm had gone off twice yesterday" may result in a text that elaborates on the two previous alarm events. As indicated above, the elaborated text (e.g., interactive response) may be generated based on a part of the document plan or a separate document plan with a focus or communicative goal of describing historic events.

Alternatively or additionally, the interactive report generation system 102 may be configured to generate a graph to display one or more key events that are detected in a data feed. In some example embodiments, the graph may also include one or more significant events in one or more related feeds and/or events. In further examples, a time period or duration of the data shown in the graph may be selected such that the displayed graph illustrates the portion of the data feed that contains the one or more key events. The output graph is further configured to include textual annotations that provide a textual comment, phrase or otherwise is configured to explain, using text, the one or more key events, the one or more significant events and/or the events in a contextual data feed in natural language. In further examples, the textual annotations are generated from the raw input data and further are designed, in some examples, to textually describe identified patterns, anomalies and/or the context of the graph. In some examples, a narrative (e.g. situational analysis text) may be included with the graph that provides situational awareness or an overview of the data/patterns displayed on and/or off of the graph. Other output modalities may be included in an output in other example embodiments.

Example System Architecture

FIG. 3 is an example block diagram of an example computing device for practicing embodiments of an example interactive report generation system. As described herein, the interactive report may be described herein as an output report. An interactive response may be the graph, text or the like that is generated in response to a selection of a hyperlink and may be referred to as the another report herein.

In particular, FIG. 3 shows a computing system 300 that may be utilized to implement an interactive report generation environment 100 having an interactive report generation system 102 including, in some examples, a document planner 130, a microplanner 132 and/or a realizer 134; and/or an optional user interface (not shown). One or more general purpose or special purpose computing systems/devices may be used to implement the interactive report generation system 102. In addition, the computing system 300 may comprise one or more distinct computing systems/devices and may span distributed locations. In some example embodiments, the interactive report generation system 102 may be configured to operate remotely via the network 350. In some example embodiments, a pre-processing module or other module that requires heavy computational load may be configured to perform that computational load and thus may be on a remote device or server. In some examples, interactive report generation environment 100 may be offered using a software as a service model. Furthermore, each block shown may represent one or more such blocks as appropriate to a specific example embodiment. In some cases one or more of the blocks may be combined with other blocks. Also, the interactive report generation system 102 may be implemented in software, hardware, firmware, or in some combination to achieve the capabilities described herein.

In the example embodiment shown, computing system 300 comprises a computer memory ("memory") 301, a display 302, one or more processors 303, input/output devices 304 (e.g., keyboard, mouse, CRT or LCD display, touch screen, gesture sensing device and/or the like), other computer-readable media 305, and communications interface 306. The processor 303 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application-specific integrated circuit (ASIC) or field-programmable gate array (FPGA), or some combination thereof. Accordingly, although illustrated in FIG. 3 as a single processor, in some embodiments the processor 303 comprises a plurality of processors. The plurality of processors may be in operative communication with each other and may be collectively configured to perform one or more functionalities of the interactive report generation system as described herein.

The interactive report generation system 102 is shown residing in memory 301. The memory 301 may comprise, for example, transitory and/or non-transitory memory, such as volatile memory, non-volatile memory, or some combination thereof. Although illustrated in FIG. 3 as a single memory, the memory 301 may comprise a plurality of memories. The plurality of memories may be embodied on a single computing device or may be distributed across a plurality of computing devices collectively configured to function as the interactive report generation system. In various example embodiments, the memory 301 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof.

In other embodiments, some portion of the contents, some or all of the components of the interactive report generation system 102 may be stored on and/or transmitted over the other computer-readable media 305. The components of the interactive report generation system 102 preferably execute on one or more processors 303 and are configured to generate interactive reports, output texts, etc. as described herein.

Alternatively or additionally, other code or programs 330 (e.g., an administrative interface, a Web server, and the like) and potentially other data repositories, such as data repository 340, also reside in the memory 301, and preferably execute on one or more processors 303. Of note, one or more of the components in FIG. 3 may not be present in any specific implementation. For example, some embodiments may not provide other computer readable media 305 or a display 302.

The interactive report generation system 102 is further configured to provide functions such as those described with reference to FIG. 1. The interactive report generation system 102 may interact with the network 350, via the communications interface 306, with remote data sources 356, third-party content providers 354 and/or client devices 358. The network 350 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX, Bluetooth) that facilitate communication between remotely situated humans and/or devices. In some instance the network 350 may take the form of the internet or may be embodied by a cellular network such as an LTE based network. In this regard, the communications interface 306 may be capable of operating with one or more air interface standards, communication protocols, modulation types, access types, and/or the like. The client devices 358 include desktop computing systems, notebook computers, mobile phones, smart phones, personal digital assistants, tablets and/or the like.

In an example embodiment, components/modules of the interactive report generation system 102 are implemented using standard programming techniques. For example, the interactive report generation system 102 may be implemented as a "native" executable running on the processor 303, along with one or more static or dynamic libraries. In other embodiments, the interactive report generation system 102 may be implemented as instructions processed by a virtual machine that executes as one of the other programs 330. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use synchronous or asynchronous client-server computing techniques. Also, the various components may be implemented using more monolithic programming techniques, for example, as an executable running on a single processor computer system, or alternatively decomposed using a variety of structuring techniques, including but not limited to, multiprogramming, multithreading, client-server, or peer-to-peer, running on one or more computer systems each having one or more processors. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the interactive report generation system 102, such as by using one or more application programming interfaces can be made available by mechanisms such as through application programming interfaces (API) (e.g. C, C++, C#, and Java); libraries for accessing files, databases, or other data repositories; through scripting languages such as XML; or through Web servers, FTP servers, or other types of servers providing access to stored data. The raw input data 110, historical data 112, and/or the domain model 114 may be implemented as one or more database systems, file systems, or any other technique for storing such information, or any combination of the above, including implementations using distributed computing techniques. Alternatively or additionally, the raw input data 110, historical data 112, and/or the domain model 114 may be local data stores but may also be configured to access data from the remote data sources/356.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the interactive report generation system 102 may be implemented or provided in other manners, such as at least partially in firmware and/or hardware, including, but not limited to one or more ASICs, standard integrated circuits, controllers executing appropriate instructions, and including microcontrollers and/or embedded controllers, FPGAs, complex programmable logic devices ("CPLDs"), and the like. Some or all of the system components and/or data structures may also be stored as contents (e.g., as executable or other machine-readable software instructions or structured data) on a computer-readable medium so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Example Process Flow Diagrams

FIGS. 4-7 illustrate example flowcharts of the operations performed by an apparatus, such as computing system 300 of FIG. 3, in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory 301 of an apparatus employing an embodiment of the present invention and executed by a processor 303 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 4-7, when executed, convert a computer or processing circuitry into a particular machine configured to perform an example embodiment of the present invention. Accordingly, the operations of FIGS. 4-7 define an algorithm for configuring a computer or processor, to perform an example embodiment. In some cases, a general purpose computer may be provided with an instance of the processor which performs the algorithm of FIGS. 4-7 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts', and combinations of blocks in the flowchart, can be implemented by special purpose hardware-based computer systems which perform the specified functions, or combinations of special purpose hardware and computer instructions.

In some example embodiments, certain ones of the operations herein may be modified or further amplified as described below. Moreover, in some embodiments additional optional operations may also be included (some examples of which are shown in dashed lines in FIG. 4). It should be appreciated that each of the modifications, optional additions or amplifications described herein may be included with the operations herein either alone or in combination with any others among the features described herein.

Figure 4:
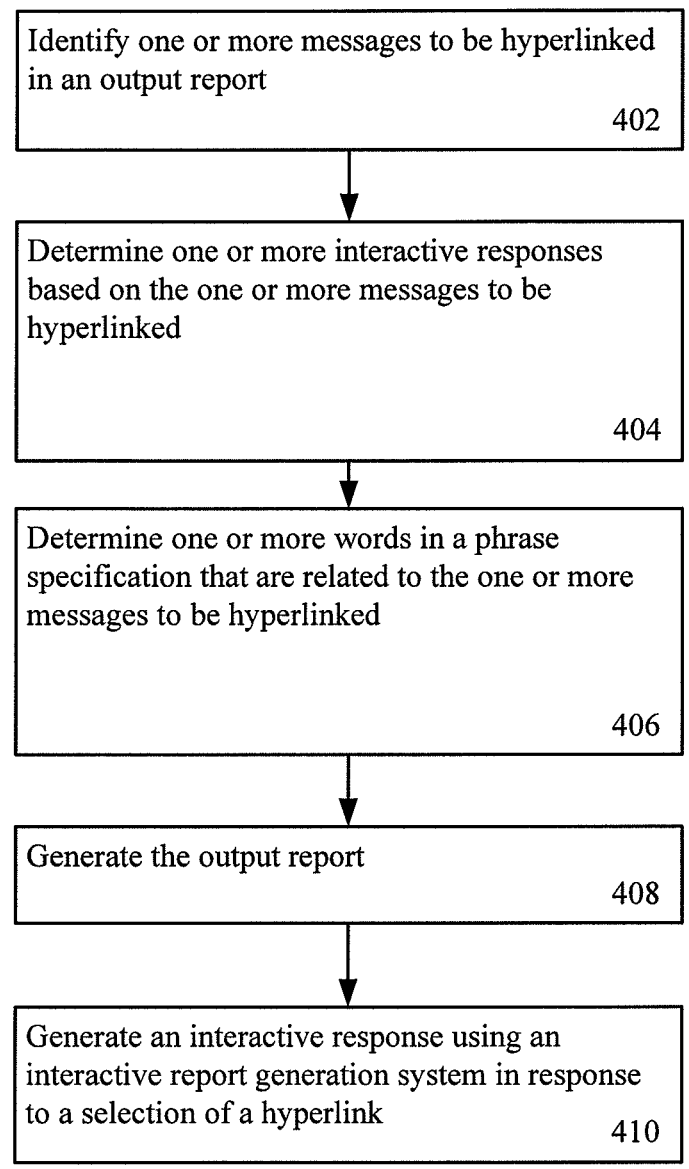

FIG. 4 is a flow chart illustrating an example method for generating an interactive response using an exemplary interactive report generation system. As is shown in operation 402, an apparatus may include means, such as the interactive report generation system 102, the processor 303, or the like, for identifying one or more messages to be hyperlinked in an output report, wherein the one or more messages are data structures that are configured to linguistically describe at least a portion of raw input data. In some example embodiments one or more messages may be identified or otherwise be predefined to define or otherwise include information that indicates the one or more messages that are to be interactive (e.g., a flag, an indicator bit or the like) when realized. Those messages that are marked as interactive will be those messages that are hyperlinked in the output text, in some examples. Alternatively or additionally, the document planner may define one or more messages to be interactive messages.

As is shown in operation 404, an apparatus may include means, such as the interactive report generation system 102, the processor 303, or the like, for determining one or more interactive responses based on the one or more messages to be hyperlinked. In some examples, the messages may indicate an interactive response. In some examples, the document plan may further define the resultant action when one or more hyperlinks are selected. In other words, the document plan may define (e.g., messages to be included in the interactive response the arrangement thereof) the communicative goal of a particular message and therefore define an interactive response. Alternatively or additionally, the interactive response may be defined by a user, by a microplanner, may be defined in the domain model or the like.

As is shown in operation 406, an apparatus may include means, such as the interactive report generation system 102, the processor 303, or the like, for determining one or more words in a phrase specification that are related to the one or more messages to be hyperlinked. In some examples, the one or more words that are related to the one or more messages are determined by hyperlinking the entire sentence in an instance in which a single message is to be realized into a single sentence and/or hyperlinking at least one of a noun phrase, verb phrase or sentence constituent related to a message that is to be hyperlinked based on at least one of lexicalization rules, aggregation rules or a referring expression generator.

As is shown in operation 408, an apparatus may include means, such as the interactive report generation system 102, the processor 303, or the like, for generating the output report, wherein the one or more words are hyperlinked in the output report such that when selected at least one of the one or more interactive responses is performed. In some examples, once realized, the report may be shown a screen via a user interface. The user interface may provide for a hyperlink in the form of an underline, box or the like. The hyperlink may be selectable, in some example embodiments, and may generate the interactive response, such as another text graph or the like. Alternatively or additionally, the hyperlink may provide a menu of potential responses in response to a click, thus prompting the user to determine whether a graph or text is desired. In some examples, the interactive response is dynamically generated based on the user's selection, whereas in other examples it may be generated, but not displayed, at the same time as the initial report.

As is shown in operation 410, an apparatus may include means, such as the interactive report generation system 102, the processor 303, or the like, for generating an interactive response using an interactive report generation system in response to a selection of a hyperlink. In some examples, the determined interactive response is a graph. As such, the apparatus may include means, such as the interactive report generation system 102, the processor 303, or the like, for detecting one or more patterns in a data channel derived from raw input data; identifying one or more patterns in another data channel also derived from the raw input data; generating one or more phrases describing the one or more patterns in the data channel and the one or more patterns in the another data channel; and generating a graphical output based on the data channel, the another data channel and the one or more phrases, wherein the one or more phrases are interactively annotated on the graphical output of the data channel and the another data channel.

Alternatively or additionally, in an instance in which the determined interactive response is another report, the apparatus may include means, such as the interactive report generation system 102, the processor 303, or the like, for determining the document plan for the another report based on a document plan for the output report and the communicative goal of the sentence containing the hyperlink and generating the another output report using an interactive report generation system.

In some examples, the output report or another output report, an interactive response or the like is generated based on the current context or other context of the user, reader or the like. For example, one or more messages can be marked as viewed by a user and those messages transformed into phrase specifications that are realized and have been previously viewed will not be displayed in a future report. In other examples, certain data channels over certain periods may be marked as viewed. As such, in instances in which an interactive response or another report is dynamically generated, such an output may be given in context and may have a reduced amount of information when compared to the amount of information originally in a document plan for the interactive response or another output report.

Figure 5:
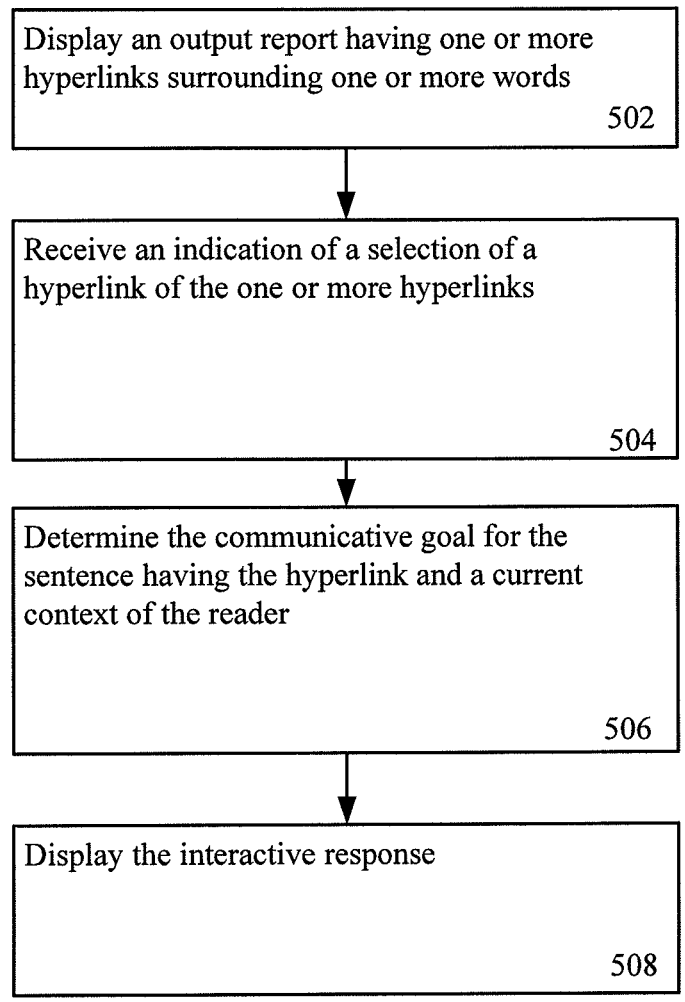

FIG. 5 is a flow chart illustrating an example method for displaying an interactive response using an exemplary interactive report generation system. As is shown in operation 502, an apparatus may include means, such as the interactive report generation system 102, the processor 303, or the like, for displaying an output report having one or more hyperlinks surrounding one or more words, wherein the one or more hyperlinks provide an indication that an interactive response is available. As is shown in operation 504, an apparatus may include means, such as the interactive report generation system 102, the processor 303, or the like, for receiving an indication of a selection of a hyperlink of the one or more hyperlinks. As is shown in operation 506, an apparatus may include means, such as the interactive report generation system 102, the processor 303, or the like, for determining, using a processor, a communicative goal for a sentence having the hyperlink and a current context of the reader. As is shown in operation 508, an apparatus may include means, such as the interactive report generation system 102, the processor 303, or the like, for displaying an interactive response.

Figure 6:
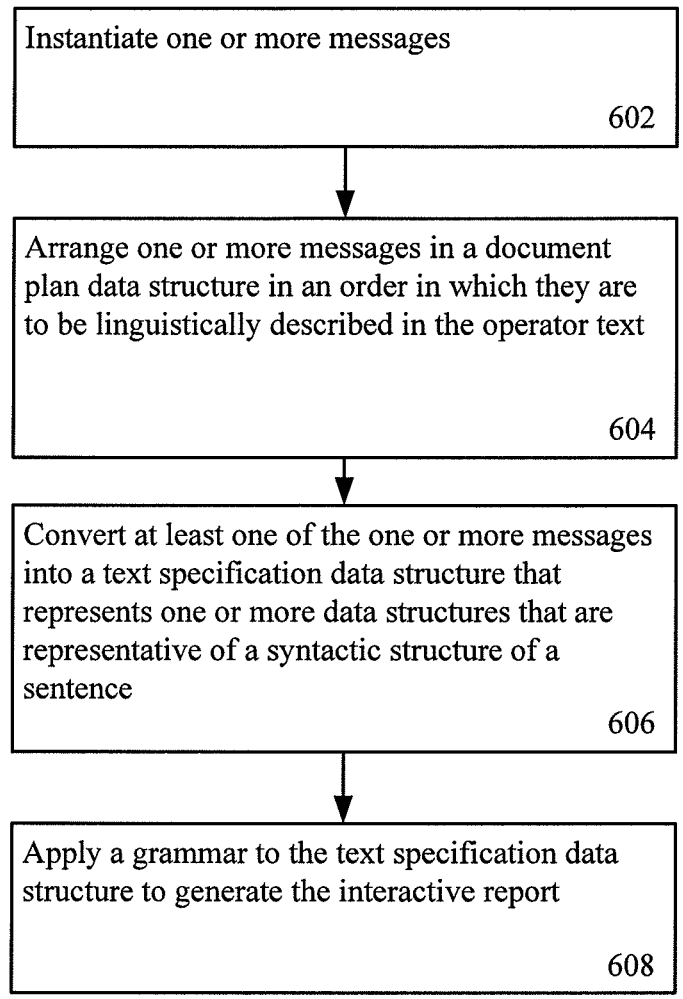

FIG. 6 is a flow chart illustrating an example method for generating the report using an exemplary interactive report generation system. As is shown in operation 602, an apparatus may include means, such as the interactive report generation system 102, the processor 303, or the like, for instantiating one or more messages. As is shown in operation 604, an apparatus may include means, such as interactive report generation system 102, the processor 303, or the like, for arranging one or more messages in a document plan in an order in which they are to be linguistically described in the output text. As is shown in operation 606, an apparatus may include means, such as interactive report generation system 102, the processor 303, or the like, for converting at least one of the one or more messages into a text specification that represents one or more data structures that are representative of a syntactic structure of a sentence As is shown in operation 608, an apparatus may include means, such as interactive report generation system 102, the processor 303, or the like, for applying a grammar to the text specification to generate the output text.

Figure 7:
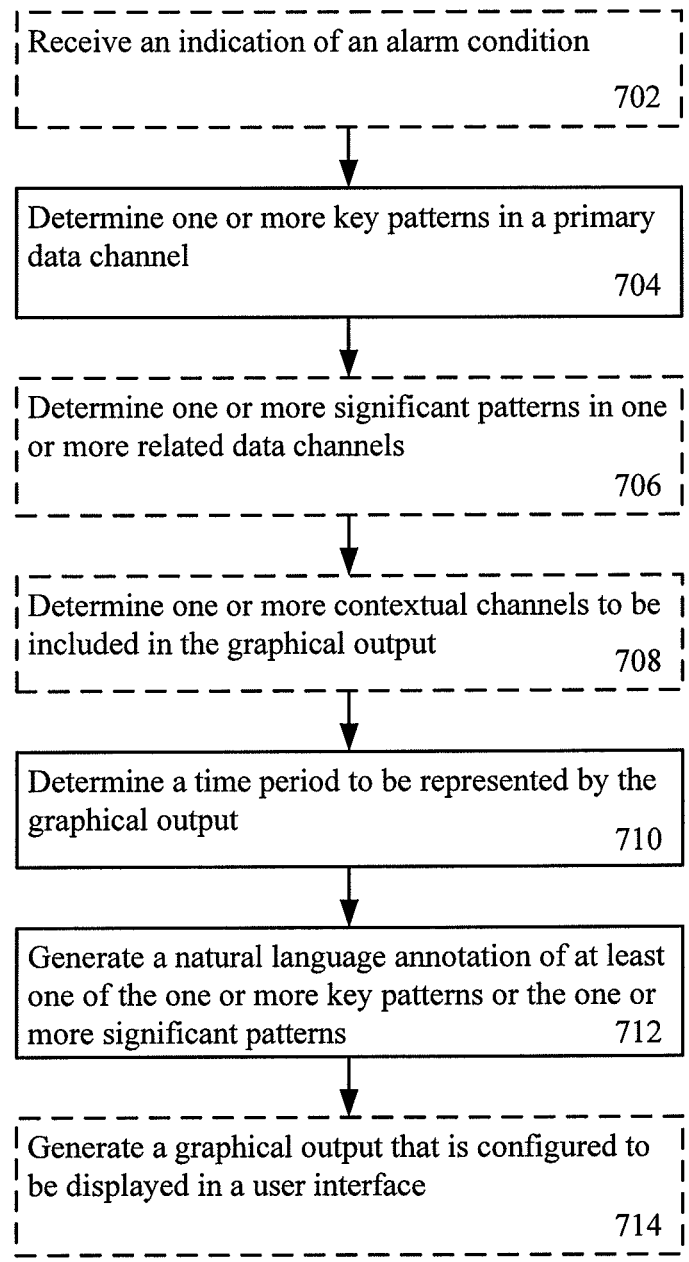

FIG. 7 is a flow chart illustrating an example method for generating graphical annotations, such as in the case a graph or annotations are to be generated as the output report or the interactive response (e.g., the another report). As is shown in operation 702, an apparatus may include means, such as the interactive report generation system 102, the processor 303, or the like, for receiving an indication of an alarm condition. In some example embodiments an alarm may cause the selection of a primary data channel and a determination of a time period in which the alarm was generated. Alternatively or additionally other means may be used to alert the apparatus to a primary data channel, such as, but not limited to, a user action, a selection of a hyperlink, a detected pattern in the raw input data or a data channel, a determined value in the raw input data or a data channel, and/or the like.

As is shown in operation 704, an apparatus may include means, such as the interactive report generation system 102, the processor 303, or the like, for determining one or more key patterns in a primary data channel. In some example embodiments the key patterns may be determined based on the time period of the alarm condition, however in other examples a larger or smaller time period may be selected.

As is shown in operation 706, an apparatus may include means, such as the interactive report generation system 102, the processor 303, or the like, for determining one or more significant patterns in one or more related data channels. In some example embodiments, the apparatus, may determine one or related channels based on one or more predefined relationships. In some examples, the predefined relationships may be defined by the domain model 114.

As is shown in operation 708, an apparatus may include means, such as interactive report generation system 102, the processor 303, or the like, for determining one or more contextual channels to be included in the graphical output. The one or more contextual channels may provide events or other context that may be indicative of the cause of the one or more key patterns and/or the one or more significant patterns. As is shown in operation 710, an apparatus may include means, such as interactive report generation system 102, the processor 303, or the like, for determining a time period to be represented by the graphical output. In some example embodiments, the time period chosen for the graph is the time period in which the one or more key patterns are displayed. As is shown in operation 712, an apparatus may include means, such as interactive report generation system 102, the processor 303, or the like, for generating a natural language annotation of at least one of the one or more key patterns or the one or more significant patterns.

As is shown in operation 714, an apparatus may include means, such as interactive report generation system 102, the processor 303, a user interface or the like, for generating a graphical output that is configured to be displayed in a user interface. In some example embodiments, the graph is configured to utilize the determined scale to display the primary data channel, one or more related channels having significant events, natural language annotations, a narrative, events and/or the like. In some example embodiments and in an instance in which a user clicks on a text annotation in the graph, a corresponding phrase in the situation analysis text may be highlighted and/or in an instance in which a user clicks on underlined phrase in the narrative or situation analysis text, a corresponding annotation may be highlighted on the graph.

In some example embodiments described herein, the apparatus, a graph may be generated (e.g., as an output report, output text, interactive report, another report or the like) having a scale (e.g. amplitude (y-axis) and/or time scale (x-axis)) that advantageously displays one or more data channels (e.g. a first or primary data channel, a secondary or related data channel and/or the like) that are derived from raw input data, one or more natural language text annotations and/or a narrative describing raw input data. As such, advantageously, a user viewing the graph, in a user interface or using other viewing means, may be provided with situational awareness with regard to the patterns shown on the graph as well as the events and or patterns that may have influenced the patterns shown on the graph.

In some examples, a first or primary data channel may be selected for inclusion in a graph based on a selection by a user, via a user interface, may be selected based on the happening of a condition such as, but not limited to, an alert, an alarm, an anomaly, a violation of a constraint, a warning, a predetermined condition, selection of a hyperlink, based on an indication that the primary data channel is related to the communicative goal and/or the like.

In some example embodiments, a secondary or related data channel may also be selected. In some cases, there may be a plurality of secondary or related data channels. The secondary or related data channel may be selected for inclusion in a graph based on the detection of anomalous, unexpected or otherwise flagged behavior in the second or related channel. In some examples, the second or related channel is compared to one or more patterns in the primary data channel over a similar time period. For example, a first data channel may indicate a rise in heart rate, whereas a second data channel may indicate a stable or even a decline in respiration rate. Generally respiration rate rises with heart rate, and, as such, a stable respiration rate is generally unexpected. In some examples, unexpected behavior may lead to a life threatening condition, be indicative of a dangerous condition or the like.

Relationships between data channels may be defined as anomalous behavior by a qualitative model such as a domain model. A domain model is a representation of information about the domain. For example a domain model may contain an ontology that specifies the kinds of objects and concepts and the like that may exist in the domain in concrete or abstract form, properties that may be predicated of the objects and concepts and the like, relationships that may hold between the objects concepts and the like, and representations of any specific knowledge that is required to function in the domain. In some example multiple domain models may be provided for a single domain. Example domains may include, but are not limited to, medical, oil and gas, industrial, weather, legal, financial and/or the like. Alternatively or additionally, a plurality of related channels may be included, for example pulse rate, oxygen levels, blood pressure and/or the like.

In some examples, patterns (e.g. a trend, spike, step or the like) may be detected or otherwise identified in the primary data channel and/or in the one or more secondary data channels. Once a pattern is detected in the primary data channel and/or the one or more secondary data channels, an importance level or importance is assigned to each of the patterns. In the primary data channel an importance level may be defined based on thresholds, constraints, predefined conditions or the like. In the secondary data channels an importance level may also be assigned based on thresholds, constraints, predefined conditions or the like, however an importance level may also be assigned based on the relationship between the secondary data channels and the primary data channels and/or the relationships between the patterns detected in the primary data channels and the patterns detected in the secondary data channels. A pattern in the primary channel may be defined as a key pattern in an instance in which the importance level of the pattern exceeds or otherwise satisfies a predefined importance level. Likewise, a significant pattern is a pattern in a secondary data channel that exceeds or otherwise satisfies a predefined importance level. In some examples, a pattern in the one or more secondary channels may also be classified as a significant pattern if it represents an anomaly or otherwise unexpected behavior when compared with the primary data channel.

In some example embodiments, a contextual channel may also be selected. A contextual channel is a data channel that provides a background or circumstance information that may have caused or otherwise influenced the one or more key patterns and/or the one or more significant patterns (e.g. proximate cause). For example, a contextual channel may indicate an event, such as a medical treatment that was applied at the time of or just prior to the rise of the heartbeat and/or the fall or steady state of the respiration rate. Alternatively or additionally, a plurality of data channels may also be selected for inclusion in a graph based on an anomaly or unexpected behavior.

Alternatively or additionally, one or more data channels may be selected for inclusion in a graph even though the one or more data channels are representative of expected behavior. For example, in the medical domain, a medical professional may expect to see both heart rate and respiration rate on a graph even if both are behaving in expected ways, since expected behavior may be indicative of an important result, namely a clean bill of health. As such, a selection of a hyperlink relating to heart rate, would provide a graph of both heart rate and respiration. In some cases, based on the current context (e.g., whether the professional has seen a graph of respiration already, the respiration rate may be omitted.

In yet further example embodiments, events may also be generated for display in the graph. An event may be described in a contextual channel, may be entered into an event log that is input with the raw input data or may be inferred. For example, caffeine administration may be entered as an explicit event in a patient record (e.g. in an event log), the caffeine could be detected by a change in one or data channels which record what medication is being administered through an IV line and/or the caffeine administration may be inferred based on a spike in heart rate. In instances in which an event is identified that satisfies an importance threshold, the event may be displayed as a visual annotation. In an example in which a graph is displayed, events may be displayed as a vertical line. Alternatively or additionally events may be generated as a horizontal line with indicators showing the multiple occurrences of an event and/or the like. In other visualizations, events may be displayed via text, indicator or other visual outputs.

In some example embodiments, a scale may be selected for the graph based on the primary data channel, the secondary data channel or the like. The scale may be determined based on a time period or duration in which a pattern that satisfies an importance threshold is identified, anomalous behavior occurs in a related data channel and/or the like. Alternatively or additionally the time period may be set by a user, may be a time period that is significant or specifically identified on the basis of properties of the domain, communicative goal, current context or the like. In some examples, if the user has already seen a graph of rate of a time period, a selection of an event may only result in a graph of a heart rate surrounding the time of the event.

In further example embodiments, textual annotations and/or a narrative may be included with the graph. The textual annotations and/or the narrative may be provided by a natural language generation system, such as interactive report generation system 102, that is configured to generate one or more textual annotations in the form of sentences or phrases that describe the patterns in the data channels, expected or unexpected behavior, an event, a contextual channel and/or the like. Additionally, in some examples, the sentences or phrases may take the form of stand-alone text that provides situational awareness and/or situational analysis of the graph. In some examples, situation analysis text may be configured to include pattern descriptions that contribute to narrative coherence, background information or the like. The textual annotations may be located on the graph, such as at the location where the anomalies and/or the patterns are represented in the graph. Alternatively or additionally, the narrative may be displayed on or near the graph in some examples. Whereas, in other examples, the narrative may be contained in a separate file, may be generated before/after or otherwise separately from the generation of the graph or may be a separate interactive response. In some examples, annotations may be shown as a preview. For example as a user is moving their cursor across the graph, an interactive response may include a text box that elaborates on a particular point on the graph. Alternatively or additionally, the textual annotations and/or narrative may be provided via speech or other available modalities.

Based on the one or more channels derived from the raw input data, the contextual channel and/or the annotations, the graph may be generated for display. The graph is configured to display a time scale that contains those identified sections (e.g. key patterns and/or significant patterns) in the one or more data channels, the textual annotations, additional available visual annotations and/or the like. In some example embodiments, user interaction with the narrative text may result in an annotation on the graphical output to be highlighted. Similarly selection of an annotation may highlight narrative text related to the annotation. Alternatively or additionally, the annotations may include a symbol or other reference numeral that is indicative of or otherwise related to the narrative. For example, the narrative may indicate that a first key pattern is indicated by an arrow, a circle, a box, a reference number or the like in the graph.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for transforming raw input data expressed in a non-linguistic format into an output in a format that can be expressed linguistically, the method comprising:
   identifying, using processing circuitry, one or more messages to be hyperlinked in an output report, wherein the one or more messages are data structures that are configured to linguistically describe at least a portion of the raw input data;
   annotating, using the processing circuitry, the one or more messages with an indication of an importance level of the one or more messages;
   annotating, using the processing circuitry, the one or more messages with an indication of a key event or significant event detected in the one or more messages, the key event or significant event detected based at least in part on the importance level and a pre-determined importance level threshold; and
   generating, using the processing circuitry, the output report comprising the indication of the key event or significant event, wherein one or more words in a phrase specification are hyperlinked in the output report such that when a hyperlink is selected at least one of one or more interactive responses is performed.

2. The method of claim 1, further comprising:
   including, using the processing circuitry, the one or more messages in the output report based at least in part on the importance level.

3. The method of claim 1, wherein the output report comprises a graph displaying the key events or significant events.

4. The method of claim 1, wherein the importance level for each of the one or more messages is based in part on a pattern displayed in the one or more messages.

5. The method of claim 1, wherein the importance level is determined over a period of time.

6. The method of claim 1, wherein the importance level of the one or more messages is based in part on historical data.

7. An apparatus for transforming raw input data expressed in a non-linguistic format into an output in a format that can be expressed linguistically, the apparatus comprising processing circuitry and at least one memory including computer program code, the at least one memory and the computer program code configured to, with the processing circuitry, cause the apparatus to:
   identify one or more messages to be hyperlinked in an output report, wherein the one or more messages are data structures that are configured to linguistically describe at least a portion of the raw input data;
   annotate the one or more messages with an indication of an importance level of the one or more messages;
   annotate the one or more messages with an indication of a key event or significant event detected in the one or more messages, the key event or significant event detected based at least in part on the importance level and a pre-determined importance level threshold; and;
   generate the output report comprising the indication of the key event or significant event, wherein one or more words in a phrase specification are hyperlinked in the output report such that when a hyperlink is selected at least one of one or more interactive responses is performed.

8. The apparatus of claim 7, wherein the at least one memory including the computer program code is further configured to, with the processing circuitry, cause the apparatus to:
   include, using the processing circuitry, the one or more messages in the output report based at least in part on the importance level.

9. The apparatus of claim 7, wherein the output report comprises a graph displaying the key events or significant events.

10. The apparatus of claim 7, wherein the importance level for each of the one or more messages is based in part on a pattern displayed in the one or more messages.

11. The apparatus of claim 7, wherein the importance level is determined over a period of time.

12. The apparatus of claim 7, wherein the importance level of the one or more messages is based in part on historical data.

13. A computer program product comprising at least one computer-readable non-transitory memory medium having program code instructions stored thereon, the program code instructions, when executed by an apparatus, causing the apparatus to:
   identify one or more messages to be hyperlinked in an output report, wherein the one or more messages are data structures that are configured to linguistically describe at least a portion of the raw input data;
   annotate the one or more messages with an indication of an importance level of the one or more messages;
   annotate the one or more messages with an indication of a key event or significant event detected in the one or more messages, the key event or significant event detected based at least in part on the importance level and a pre-determined importance level threshold; and
   generate the output report comprising the indication of the key event or significant event, wherein one or more words in a phrase specification are hyperlinked in the output report such that when a hyperlink is selected at least one of one or more interactive responses is performed.

14. The computer program product of claim 13, wherein the program code instructions, when executed by the apparatus, further cause the apparatus to:
   include, using the processing circuitry, the one or more messages in the output report based at least in part on the importance level.

15. The computer program product of claim 13, wherein the output report comprises a graph displaying the key events or significant events.

16. The computer program product of claim 13, wherein the importance level for each of the one or more messages is based in part on a pattern displayed in the one or more messages.

17. The computer program product of claim 13, wherein the importance level is determined over a period of time.

18. The computer program product of claim 13, wherein the importance level of the one or more messages is based in part on historical data.

19. The computer program product of claim 13, wherein one or more words in a phrase specification are hyperlinked in the output report such that when a hyperlink is selected at least one of one or more interactive responses is performed.

* * * * *